(12) United States Patent
Lei et al.

(10) Patent No.: US 11,368,263 B2
(45) Date of Patent: Jun. 21, 2022

(54) GROUP HOPPING ENHANCEMENT FOR BASE SEQUENCES

(71) Applicant: QUALCOMM Incorporated, San Diego, CA (US)

(72) Inventors: Jing Lei, San Diego, CA (US); Seyong Park, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/991,809

(22) Filed: Aug. 12, 2020

(65) Prior Publication Data
US 2021/0050967 A1 Feb. 18, 2021

Related U.S. Application Data

(60) Provisional application No. 62/886,708, filed on Aug. 14, 2019.

(51) Int. Cl.
*H04W 72/04* (2009.01)
*H04L 5/00* (2006.01)
*H04W 72/02* (2009.01)

(52) U.S. Cl.
CPC .......... *H04L 5/0012* (2013.01); *H04L 5/0091* (2013.01); *H04W 72/02* (2013.01); *H04W 72/042* (2013.01)

(58) Field of Classification Search
CPC ....... H04L 5/14; H04L 5/0012; H04L 5/0091; H04L 5/0048; H04L 5/0023; H04W 72/0413; H04W 72/042; H04W 72/02
See application file for complete search history.

(56) References Cited

U.S. PATENT DOCUMENTS 10,299,261 B2   5/2019  Chun et al.
2011/0085606 A1  4/2011  Gaal et al.
(Continued)

FOREIGN PATENT DOCUMENTS

EP          2765817 A1   8/2014
WO    WO-2019029651 A1   2/2019

OTHER PUBLICATIONS

International Search Report and Written Opinion—PCT/US2020/046189—ISA/EPO–Nov. 20, 2020.
(Continued)

*Primary Examiner* — Wei Zhao
(74) *Attorney, Agent, or Firm* — Qualcomm Incorporated

(57) ABSTRACT

Methods, systems, and devices for wireless communications are described. A network may generate a pool of distinct base sequences for use with uplink messages from a user equipment (UE) to a base station, where each base sequence in the pool of distinct base sequences may have a peak to average power ratio below a threshold. A base station may assign the pool of distinct base sequences into groups of base sequences based on a group size and a hopping pattern reuse factor. The base station may assign the groups of base sequences to cells and signal the group size and a hopping pattern index to UEs in the cells. A UE in a cell may identify the group of base sequences assigned to the cell based on the signaled parameters and select a base sequence for use in transmitting an uplink message to the base station.

30 Claims, 18 Drawing Sheets

(56) References Cited

U.S. PATENT DOCUMENTS

| | | | | |
|---|---|---|---|---|
| 2012/0113866 A1* | 5/2012 | Tenny | ................... | H04W 24/10 |
| | | | | 370/254 |
| 2013/0294318 A1* | 11/2013 | Amerga | ................. | H04W 4/06 |
| | | | | 370/312 |
| 2016/0112977 A1 | 4/2016 | Byun et al. | | |
| 2019/0280734 A1* | 9/2019 | Park | .................... | H04B 1/7143 |
| 2020/0145079 A1 | 5/2020 | Marinier et al. | | |

OTHER PUBLICATIONS

Qualcomm Incorporated: "Lower PAPR Reference Signals", R1-1903468, 3GPP TSG-RAN WG1 Meeting #96, Lower Papr Reference Signals, 3rd Generationpartnership Project (3GPP), Mobile Competence Centre; 650, Route Des Lucioles; F-06921 Sophia-Antipolis Cedex; France, vol. RAN WG1, No. Athens, Greece; Feb. 25,2019-Mar. 1, 2019,Feb. 27, 2019 (Feb. 27, 2019), pp. 1-25, XP051601133, Retrieved from the Internet: URL: http://www.3gpp.org/ftp/tsg%5Fran/WG1%5FRL1/TSGR1%5F96/Docs/R1%2D1903468%2Ezip [retrieved on Feb. 27, 2019], p. 12, paragraph 4-p. 13, paragraphs; figure 13.

Qualcomm Incorporated: "Virtual Cell ID for SRS", 3GPP Draft, R1-1902381,3GPP TSG-RAN WG1 #96, SRS Virtual Cell ID, 3rd Generation Partnership Project (3GPP), Mobile Competence Centre, 650, Route Des Lucioles, F-06921, Sophia-Antipolis, Cedex, France, vol. Ran WG1, No. Athens, Greece, Feb. 25, 2019-Mar. 1, 2019, Feb. 16, 2019 (Feb. 16, 2019), XP051600077, 3 Pages, Retrieved from the Internet: URL:http://www.3gpp.org/ftp/tsg%5Fran/WG1%5FRL1/TSGR1%5F96/Docs/R1%2D1902381%2Ezip [retrieved on Feb. 16, 2019], p. 1, Paragraph 2, p. 2, Paragraph 3, p. 3, Paragraph 4.

* cited by examiner

FIG. 3A

| Group 0 | Group 1 | Group 2 | Group 3 | Group 4 | Group 5 | Group 6 | Group 7 | Group 8 | Group 9 |
|---|---|---|---|---|---|---|---|---|---|
| 0 | 6 | 12 | 18 | 24 | 0 | 7 | 14 | 21 | 28 |
| 1 | 7 | 13 | 19 | 25 | 6 | 13 | 20 | 27 | 5 |
| 2 | 8 | 14 | 20 | 26 | 12 | 19 | 26 | 4 | 11 |
| 3 | 9 | 15 | 21 | 27 | 18 | 25 | 3 | 10 | 17 |
| 4 | 10 | 16 | 22 | 28 | 24 | 2 | 9 | 16 | 23 |
| 5 | 11 | 17 | 23 | 29 | 1 | 8 | 15 | 22 | 29 |

300-a 310-a: Group 0 – Group 4 (305-a – 305-e); 310-b: Group 5 – Group 9 (305-f – 305-j)

FIG. 3B

| Group 0 | Group 1 | Group 2 | Group 3 | Group 4 | Group 5 | Group 6 | Group 7 |
|---|---|---|---|---|---|---|---|
| 0 | 8 | 16 | 24 | 16 | 18 | 20 | 22 |
| 1 | 9 | 17 | 25 | 24 | 26 | 28 | 0 |
| 2 | 10 | 18 | 26 | 1 | 3 | 5 | 7 |
| 3 | 11 | 19 | 27 | 9 | 11 | 13 | 15 |
| 4 | 12 | 20 | 28 | 17 | 19 | 21 | 23 |
| 5 | 13 | 21 | 29 | 25 | 27 | 29 | 8 |
| 6 | 14 | 22 | 0 | 2 | 4 | 6 | 16 |
| 7 | 15 | 23 | 8 | 10 | 12 | 14 | 18 |

300-b 310-c: Group 0 – Group 3 (305-k – 305-n); 310-d: Group 4 – Group 7 (305-o – 305-r)

GROUP HOPPING ENHANCEMENT FOR BASE SEQUENCES

CROSS REFERENCE

The present application for patent claims the benefit of U.S. Provisional Patent Application No. 62/886,708 by LEI et al., entitled "GROUP HOPPING ENHANCEMENT FOR BASE SEQUENCES," filed Aug. 14, 2019, assigned to the assignee hereof, and expressly incorporated by reference herein.

FIELD OF TECHNOLOGY

The following relates generally to wireless communications and more specifically to group hopping enhancement for base sequences.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

UEs may transmit uplink transmissions to a base station without a scheduling grant. As the number of UEs in a system increases, the probability of collision between grant free transmissions from multiple UEs may increase, which may lead to degraded performance or efficiency.

SUMMARY

The described techniques relate to improved methods, systems, devices, and apparatuses that support group hopping enhancement for base sequences. Generally, the described techniques provide for improved base sequence selection for uplink (UL) messages from a user equipment (UE) to a base station. A network may generate a pool of distinct base sequences, where each base sequence in the pool of distinct base sequences may have a peak to average power ratio (PAPR) below a threshold, to facilitate consistent and efficient channel estimation. A base station may assign the pool of distinct base sequences into groups of base sequences based on a group size and a hopping pattern reuse factor, for example by constructing a table of index values associated with the pool of distinct base sequences. The base station may assign the groups of base sequences to cells associated with the base station, and signal the group size and a hopping pattern index to UEs in the cells. A UE in a cell may identify the group of base sequences assigned to the cell based on the signaled parameters, and select a base sequence for use in transmitting a UL message (such as a grant free message) to the base station.

A method of wireless communications at a UE is described. The method may include receiving a message indicating a group size and a hopping pattern index, where the group size corresponds to a size of a set of groups of a pool of distinct base sequences having a PAPR below a threshold, and where the hopping pattern index corresponds to a cell identifier of a set of cell identifiers, selecting a base sequence from a group of the set of groups indicated by the hopping pattern index, where the group corresponds to an identified cell identifier of the set of cell identifiers, and transmitting a UL message based on the selected base sequence on a cell corresponding to the identified cell identifier.

An apparatus for wireless communications at a UE is described. The apparatus may include a processor, memory coupled with the processor, and instructions stored in the memory. The instructions may be executable by the processor to cause the apparatus to receive a message indicating a group size and a hopping pattern index, where the group size corresponds to a size of a set of groups of a pool of distinct base sequences having a PAPR below a threshold, and where the hopping pattern index corresponds to a cell identifier of a set of cell identifiers, select a base sequence from a group of the set of groups indicated by the hopping pattern index, where the group corresponds to an identified cell identifier of the set of cell identifiers, and transmit a UL message based on the selected base sequence on a cell corresponding to the identified cell identifier.

Another apparatus for wireless communications at a UE is described. The apparatus may include means for receiving a message indicating a group size and a hopping pattern index, where the group size corresponds to a size of a set of groups of a pool of distinct base sequences having a PAPR below a threshold, and where the hopping pattern index corresponds to a cell identifier of a set of cell identifiers, selecting a base sequence from a group of the set of groups indicated by the hopping pattern index, where the group corresponds to an identified cell identifier of the set of cell identifiers, and transmitting a UL message based on the selected base sequence on a cell corresponding to the identified cell identifier.

A non-transitory computer-readable medium storing code for wireless communications at a UE is described. The code may include instructions executable by a processor to receive a message indicating a group size and a hopping pattern index, where the group size corresponds to a size of a set of groups of a pool of distinct base sequences having a PAPR below a threshold, and where the hopping pattern index corresponds to a cell identifier of a set of cell identifiers, select a base sequence from a group of the set of groups indicated by the hopping pattern index, where the group corresponds to an identified cell identifier of the set of cell identifiers, and transmit a UL message based on the selected base sequence on a cell corresponding to the identified cell identifier.

Some examples of the method, apparatuses, and non-transitory computer-readable medium described herein may further include operations, features, means, or instructions for assigning the pool of distinct base sequences into the set of groups based on the group size, a hopping pattern reuse factor, and a size of the pool.

In some examples of the method, apparatuses, and non-transitory computer-readable medium described herein, assigning the pool of distinct base sequences further may include operations, features, means, or instructions for constructing a table having a row length corresponding to the hopping pattern reuse factor and a column length corresponding to the group size, where each column of the table corresponds to a hopping pattern index of a set of hopping pattern indexes and a group of the set of groups.

In some examples of the method, apparatuses, and non-transitory computer-readable medium described herein, constructing the table further may include operations, features, means, or instructions for filling columns of a first part of the table according to ascending index values of the pool of distinct base sequences, and filling columns of a second part of the table according to a block interleaving pattern with respect to the first part of the table, where the block interleaving pattern may include operations, features, means, or instructions for filling the columns of the second part of the table using index values from rows of the first part of the table.

Some examples of the method, apparatuses, and non-transitory computer-readable medium described herein may further include operations, features, means, or instructions for applying a permutation operation or a cyclic shift to one or more base sequences of the group corresponding to the identified cell identifier, and generating a sorted list of base sequences based on the permutation operation or the cyclic shift. Some examples of the method, apparatuses, and non-transitory computer-readable medium described herein may further include operations, features, means, or instructions for transmitting the UL message using the selected base sequence over a first symbol, selecting a second base sequence from the sorted list of base sequences, and transmitting a second UL message using the second base sequence over a second symbol.

In some examples of the method, apparatuses, and non-transitory computer-readable medium described herein, selecting the base sequence further may include operations, features, means, or instructions for retrieving the base sequence from a look up table at the UE. In some examples of the method, apparatuses, and non-transitory computer-readable medium described herein, the pool of distinct base sequences having a PAPR below a threshold includes Zadoff-Chu sequences, computer generated search sequences, chirp sequences, Gold sequences, or a combination thereof. In some examples of the method, apparatuses, and non-transitory computer-readable medium described herein, the UL message includes a grant-free message. In some examples of the method, apparatuses, and non-transitory computer-readable medium described herein, the message indicating the group size and the hopping pattern index includes a system information message.

A method of wireless communications is described. The method may include identifying a pool of distinct base sequences having a PAPR below a threshold, assigning the pool of distinct base sequences into a set of groups, where each group of the set of groups corresponds to a cell identifier of a set of cell identifiers, and transmitting a message indicating a group size and a hopping pattern index, where the group size corresponds to a size of the set of groups and the hopping pattern index corresponds to an identified cell identifier of the set of cell identifiers.

An apparatus for wireless communications is described. The apparatus may include a processor, memory coupled with the processor, and instructions stored in the memory. The instructions may be executable by the processor to cause the apparatus to identify a pool of distinct base sequences having a PAPR below a threshold, assign the pool of distinct base sequences into a set of groups, where each group of the set of groups corresponds to a cell identifier of a set of cell identifiers, and transmit a message indicating a group size and a hopping pattern index, where the group size corresponds to a size of the set of groups and the hopping pattern index corresponds to an identified cell identifier of the set of cell identifiers.

Another apparatus for wireless communications is described. The apparatus may include means for identifying a pool of distinct base sequences having a PAPR below a threshold, assigning the pool of distinct base sequences into a set of groups, where each group of the set of groups corresponds to a cell identifier of a set of cell identifiers, and transmitting a message indicating a group size and a hopping pattern index, where the group size corresponds to a size of the set of groups and the hopping pattern index corresponds to an identified cell identifier of the set of cell identifiers.

A non-transitory computer-readable medium storing code for wireless communications is described. The code may include instructions executable by a processor to identify a pool of distinct base sequences having a PAPR below a threshold, assign the pool of distinct base sequences into a set of groups, where each group of the set of groups corresponds to a cell identifier of a set of cell identifiers, and transmit a message indicating a group size and a hopping pattern index, where the group size corresponds to a size of the set of groups and the hopping pattern index corresponds to an identified cell identifier of the set of cell identifiers.

Some examples of the method, apparatuses, and non-transitory computer-readable medium described herein may further include operations, features, means, or instructions for assigning the pool of distinct base sequences into the set of groups based on the group size, a hopping pattern reuse factor, and a size of the pool.

In some examples of the method, apparatuses, and non-transitory computer-readable medium described herein, assigning the pool of distinct base sequences further may include operations, features, means, or instructions for constructing a table having a row length corresponding to the hopping pattern reuse factor and a column length corresponding to the group size, where each column of the table corresponds to a group of the set of groups.

In some examples of the method, apparatuses, and non-transitory computer-readable medium described herein, constructing the table further may include operations, features, means, or instructions for filling columns of a first part of the table according to ascending index values of the pool of distinct base sequences, and filling columns of a second part of the table according to a block interleaving pattern with respect to the first part of the table, where the block interleaving pattern may include operations, features, means, or instructions for filling the columns of the second part of the table using index values from rows of the first part of the table.

Some examples of the method, apparatuses, and non-transitory computer-readable medium described herein may further include operations, features, means, or instructions for applying a permutation operation or a cyclic shift to one or more base sequences of a group of the set of groups corresponding to the identified cell identifier, and generating a sorted list of base sequences based on the permutation operation or the cyclic shift.

Some examples of the method, apparatuses, and non-transitory computer-readable medium described herein may further include operations, features, means, or instructions for receiving a UL message on an identified cell associated with the identified cell identifier over a first symbol, where the UL message may be based on a base sequence selected from the group corresponding to the identified cell identifier, and receiving a second UL message over a second symbol, where the second UL message may be based on a second base sequence selected from the sorted list of base sequences.

In some examples of the method, apparatuses, and non-transitory computer-readable medium described herein, the pool of distinct base sequences having a PAPR below a threshold includes Zadoff-Chu sequences, computer generated search sequences, chirp sequences, Gold sequences, or a combination thereof. In some examples of the method, apparatuses, and non-transitory computer-readable medium described herein, the message indicating the group size and the hopping pattern index includes a system information message.

BRIEF DESCRIPTION OF THE DRAWINGS

FIGS. 3A and 3B illustrate examples of hopping pattern tables that support group hopping enhancement for base sequences in accordance with aspects of the present disclosure.

DETAILED DESCRIPTION

Figure 1:
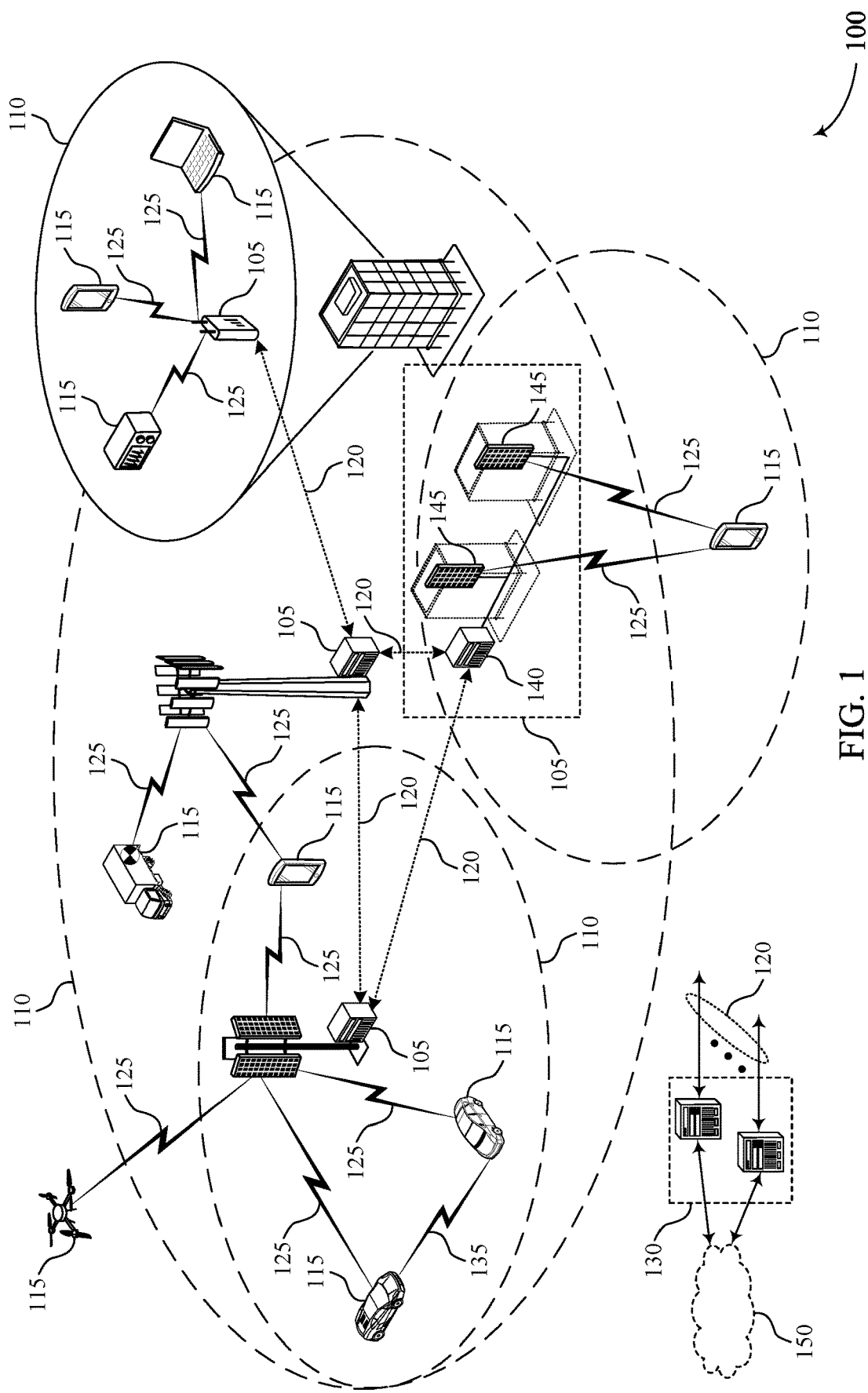
FIGS. 1 and 2 illustrate examples of wireless communications systems that support group hopping enhancement for base sequences in accordance with aspects of the present disclosure.

Some wireless communication systems, such as fifth generation (5G) systems which may be referred to as New Radio (NR) systems, may include user equipment (UE) communicating with network nodes such as base stations. For example, multiple UEs associated with one or more cells may transmit uplink (UL) messages to a base station. Some UL messages may be transmitted without a scheduling grant from the base station. Such UL messages, which may be referred to as grant free transmissions or grant free messages, may improve efficiency at the UEs. For example, UEs transmitting grant free messages may benefit from a reduction in signaling overhead and increased power saving.

UEs may transmit grant free messages in one or more use cases. For example, a UE may transmit a configured grant transmission for ultra-reliable low-latency communications (URLLC). A UE may also transmit a grant free message in a random access channel (RACH) procedure, such as when a UE transmits a msgA transmission as part of a two-step RACH procedure. Still other grant free messages may include small data transfers while the UE is in an inactive or an idle state of a radio resource control (RRC) connection with a network.

A UE may transmit one or more reference signals in a grant free message to a base station. For example, the UE may transmit a demodulation reference signal (DMRS) for a physical uplink shared channel (PUSCH) transmission, a sounding reference signal (SRS), a channel state information reference signal (CSI-RS), a preamble, or a combination thereof. The UE may transmit a reference signal using a base sequence corresponding to a cell of the base station associated with the UE. The base sequence may have a configured length (e.g., 6, 12, 18, 24). The base sequence may have a peak to average power ratio (PAPR) that is low (e.g., below a threshold), where power variations of the reference signal are limited across the time domain and the frequency domain to facilitate consistent and efficient channel estimation.

The base sequence for the UE or the cell may be selected from a pool of base sequences. The pool of base sequences may include a quantity of distinct base sequences (e.g., 30 base sequences) that may be configured by the network (e.g., via higher-layer signaling). Each base sequence in the pool of base sequences may have the same length. In some examples, the base sequences in the pool of base sequences may be generated by a closed form formula. The pool of base sequences may include Zadoff-Chu sequences, chirp sequences, Gold sequences, computer generated search sequences, other sequences, or a combination thereof. In some examples, the pool of base sequences may be represented by a lookup table. Each base sequence in the pool of base sequences may have a PAPR that is below a threshold. Each base sequence in the pool of base sequences may have an index configured by the network. Each base sequence in the pool of base sequences may be orthogonal or quasi orthogonal to each other base sequence in the pool of base sequences. The UEs and the base stations in the network may each be configured with the pool of base sequences.

A cell may be configured with one or more base sequences. The quantity of base sequences configured for the cell may be determined by the network based on a signaling overhead. The one or more base sequences for the cell may be randomly assigned from a limited pool of base sequences (e.g., 30 base sequences). A UE associated with the cell may randomly select a base sequence from the one or more base sequences configured for the cell.

A base station may receive UL messages from multiple UEs via frequency domain multiplexing (FDM) or time domain multiplexing (TDM). The UL messages may be received on a configured number of ports. The UL message ports may be orthogonal based on an orthogonal cover code (OCC). Because the pool of base sequences is limited, a collision may occur at the base station between UL messages from UEs in neighboring cells (e.g., inter-cell interference) or between UL message from UEs in the same cell (e.g., intra-cell interference). A collision may occur when a first UL message from a first UE and a second UL message from a second UE are both transmitted using the same base sequence. The base station may be unable to differentiate between the UL messages and fail to decode the UL messages. As the number of UEs in NR systems increases, it may be desirable to enhance a multiplexing capacity at base stations for grant-free messages. As the number of UEs and cells increases, however, the probability of collision may also increase, which may lead to degraded performance or efficiency.

Techniques are described herein to enable a group hopping configuration for base sequences supporting improved base sequence selection for UL messages from UEs to base stations. A network may generate a pool of base sequences with PAPRs below a threshold. The pool of base sequences may include a number P of distinct base sequences (e.g., 30 distinct base sequences). Each base sequence may have an index w, where w may be a number from 0 to P−1. The pool of P distinct base sequences may be generated to reduce correlation between base sequences with different indexes. That is, for any two base sequences with indexes $w_1$ and $w_2$, where $w_1 \neq w_2$, the first base sequence with the index may be orthogonal or quasi-orthogonal to the second base sequence with the index $w_2$. Additionally, each base sequence in the pool of base sequences may be orthogonal or quasi-orthogonal to a permuted or cyclically shifted version of the base sequence. Each base sequence in the pool of P distinct base sequences may have an equal and finite length M. The number P and indexes w may be configured by the network (e.g., via higher-layer signaling).

A cell of a base station in the network may have a cell index k. The cell index k, which may also be referred to as a hopping pattern index, may be associated with a physical cell identifier (PCID) or a virtual cell identifier (VCID) of the cell. The network may configure a group of base sequences from the pool of P distinct base sequences for the cell with index k. The group of base sequences may have a group size L. The group size L may be configured based on a probability of collision. The indexes of the L base sequences in the group may be included in a group $U_k$. An index $w_{k,l}$ may be an index of the l-th base sequence in the group $U_k$, where l may be a number from 0 to L−1. The group $U_k$ may be generated as a function of the cell index k and an orthogonal frequency division multiplexing (OFDM) symbol index q. In some examples, the group $U_k$ may be generated by constructing a table using a block interleaving pattern, for example based on the group size L and a hopping pattern reuse factor K. The table may include K columns and L rows, and each column may correspond to a cell index k. The hopping pattern reuse factor K may be determined by the network based on a density of cells within a geographic area.

A UE associated with the cell may receive signaling from the base station indicating the group size L and the cell index k. The UE may determine the group $U_k$ and select a base sequence from the group to use when transmitting a UL message to the base station. In some examples, the UE may transmit UL messages over multiple OFDM symbols or multiple transmission opportunities. The UL messages in subsequent transmission opportunities may include permuted or cyclically shifted versions of the base sequence used for the first transmission opportunity. The group $U_k$ may be a function of a time t given by $U_k(t+1)=\Pi^t U_k(t)$, where $\Pi^t$ may be a permutation operation applied to the group of base sequences at the time t.

The base station may transmit signaling to UEs in the cell indicating the group size L and the cell index k, which may reduce the signaling overhead for configuring UEs in the cell. The base station may determine the group $U_k$. The base station may receive a UL message from the UE associated with the cell using a selected base sequence from the group $U_k$. In some examples, collisions at the base station from UL messages from multiple UEs may be reduced by increasing a number of transmission opportunities for the UEs to transmit UL messages due to the permutation or cyclic shift of base sequences between transmission opportunities.

Particular aspects of the subject matter described herein may be implemented to realize one or more advantages. For example, because the groups of base sequences for neighboring cells may include different base sequences, the probability of inter-cell interference may decrease. Additionally, the UEs associated with a given cell may each select from a group of base sequences, rather than a base sequence being assigned to all UEs in the cell. As a result, the probability of intra-cell interference may decrease. The described techniques may additionally support improvements in power savings, among other advantages. As such, supported techniques may include improved UE operations and, in some examples, may promote UE efficiencies, among other benefits.

Aspects of the disclosure are initially described in the context of wireless communications systems. Additional examples of hopping pattern tables and a process flow are then discussed. Aspects of the disclosure are further illustrated by and described with reference to apparatus diagrams, system diagrams, and flowcharts that relate to group hopping enhancement for base sequences.

FIG. 1 illustrates an example of a wireless communications system 100 that supports group hopping enhancement for base sequences in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more UL component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using TDM techniques, FDM techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a PCID, a VCID, or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support URLLC or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, UL transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 (e.g., a gNB in an NR system) may identify a pool of base sequences with PAPRs below a threshold. The base station 105 may determine groups of base sequences, where each group may correspond to a cell identifier (e.g., a PCID or a VCID) of a cell associated with the base station 105. The base station 105 may transmit a signal (e.g., a system information message) indicating a group size and a hopping pattern index to a cell associated with a coverage area 110.

A UE 115 in the coverage area 110 may receive the signaling indicating the group size and the hopping pattern index. The UE 115 may determine a group of base sequences based on the group size and hopping pattern index. In some examples, the UE 115 may determine the group of base sequences based on constructing a table using a block interleaving pattern based on the group size and a hopping pattern reuse factor. The hopping pattern index may identify the column of the table including the group of base sequences.

The UE 115 may select a base sequence from the group of base sequences for transmitting a UL message (e.g., a grant free message) to the base station 105 on the cell associated with the coverage area 110. In some examples, the UE 115 may apply a permutation operation or a cyclic shift to the group of base sequences to determine a sorted list of base sequences for transmitting the UL message in subsequent symbols or transmission opportunities. The wireless communications system 100 may therefore include features for improved power savings and, in some examples, may promote improved UL transmission efficiencies, among other benefits.

Figure 2:
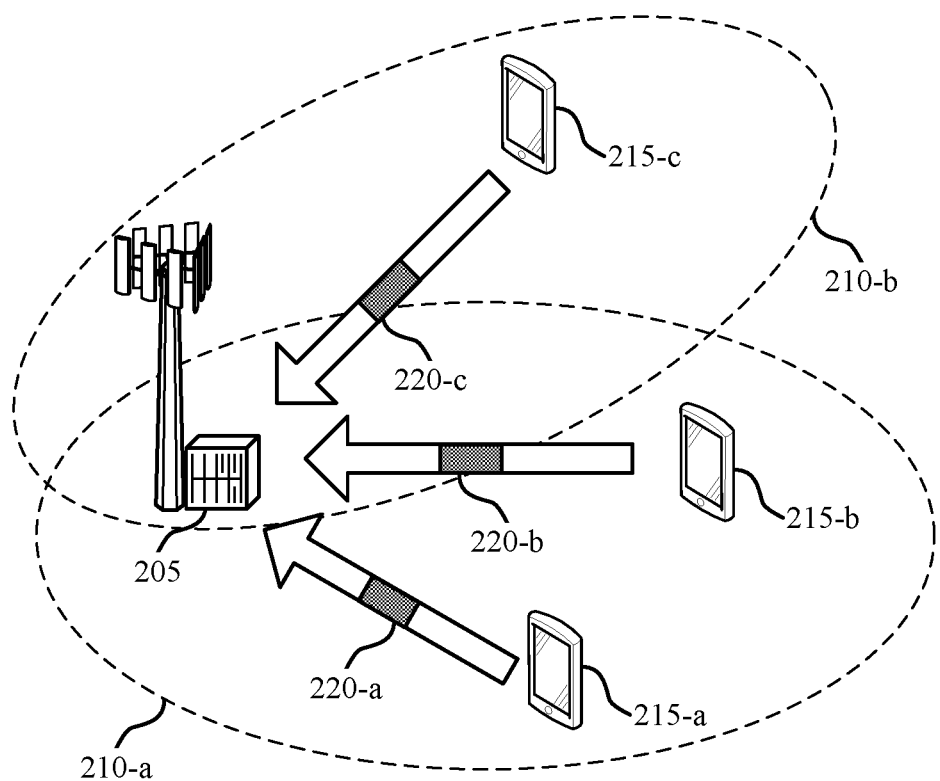

FIG. 2 illustrates an example of a wireless communications system 200 that supports group hopping enhancement for base sequences in accordance with aspects of the present disclosure. In some examples, wireless communications system 200 may implement aspects of wireless communication system 100. For example, the wireless communications system 200 may include a base station 205 and a UE 215, which may be examples of the corresponding devices described with reference to FIG. 1. The wireless communications system 200 may include features for improved UE operations, among other benefits.

The base station 205 may receive one or more UL messages 220 from one or more UEs 215 on one or more cells 210 associated with the base station 205. In the example illustrated in FIG. 2, the UE 215-*a* transmits the UL message 220-*a* on the cell 210-*a*, the UE 215-*b* transmits the UL message 220-*b* on the cell 210-*a*, and the UE 215-*c* transmits the UL message 220-*c* on the cell 210-*b*. Each UE 215 may select a base sequence for transmitting the UL message 220. Because the pool of base sequences may be limited (e.g., to 30 base sequences), a collision may occur at the base station 205 between UL messages 220 if base sequences assigned to or selected by the cells 210 are the same for the neighboring cells 210-*a* and 210-*b*. For example, the UL message 220-*a* from the UE 215-*a* in the cell 210-*a* may collide with the UL message 220-*b* from the UE 215-*b* in the cell 210-*a*, which may result in intra-cell interference. Additionally or alternatively, the UL message 220-*a* from the UE 215-*a* in the cell 210-*a* may collide with the UL message 220-*c* from the UE 215-*c* in the cell 210-*b*, which may result in inter-cell interference. The base station 205 may be unable to differentiate between the UL messages 220 and thus fail to decode the UL messages 220.

A probability of collision may be reduced when the base station 205 assigns a group of base sequences to each cell 210 rather than randomly assigning base sequences (or having the UE 215 randomly select a base sequence according to a pseudo-random function). The base station 205 may identify a pool of distinct base sequences generated by a network. Each base sequence may have an index. The base station 205 may determine groups of base sequences from the pool of base sequences. The base station 205 may assign a group of base sequences to each cell 210. The groups of base sequences may be determined and assigned such that the base sequences in the group of base sequences assigned to the cell 210-*a* are partially or completely distinct from the base sequences in the group of base sequences assigned to the neighboring cell 210-*b*.

The base station 205 may transmit signaling such as a system information message to the UE 215-*a*. The signaling may indicate a group size and a hopping pattern index, where the hopping pattern index corresponds to a cell identifier (e.g., a PCID or a VCID) of the cell 210-*a*. The UE 215-*a* may determine the group of base sequences assigned to the cell 210-*a* based on the group size and the hopping pattern index, and select a base sequence from the group of base sequences for transmitting the UL message 220-*a* to the base station 205.

In some examples, the UE 215-*a* may determine the group of base sequences by constructing a table of the indexes associated with the pool of base sequences. The number of indexes in each column may correspond to the group size, and the number of columns may be correspond to a hopping pattern reuse factor configured by the network (e.g., via higher-layer signaling). The hopping pattern reuse factor may be determined by the network based on a density of cells 210 within a geographic area.

FIGS. 3A and 3B illustrate examples of hopping pattern tables 300 that support group hopping enhancement for base sequences in accordance with aspects of the present disclosure. In some examples, the hopping pattern tables 300 may implement aspects of wireless communication systems 100 and 200. The hopping pattern tables 300 may be associated with one or more UEs or base stations, which may be examples of corresponding devices described with reference to FIGS. 1 and 2. The hopping pattern tables 300 may include features for improved UE operations, among other benefits.

A device (which may be a UE or a base station) may determine groups 305 of base sequences from a pool of P distinct base sequences by constructing a hopping pattern table 300 associated with the pool of base sequences. The number of rows of the hopping pattern table 300 may correspond to a group size L, which may correspond to a number of indexes in each group 305. The number of columns may correspond to a hopping pattern reuse factor K configured by the network (e.g., via higher-layer signaling). The hopping pattern reuse factor may be determined by the network based on a density of cells within a geographic area. The device may determine the groups by filling columns of a first table part 310 according to ascending index values of the pool of base sequences, then filling columns of a second table part 310 using a block interleaving pattern, where the index values in rows of the first table part 310 are used to fill columns in the second table part 310. Each group 305 may be assigned to a cell index k, which may be signaled along with the group size L to UEs 115 in an associated cell.

FIG. 3A illustrates an example of a hopping pattern table 300-*a* for determining base sequence groups 305. As shown in the example FIG. 3A, the pool of base sequences may include P=30 base sequences, with index values from 0 to 29. The network may configure the hopping pattern reuse factor as K=10, and the device may determine the group size is L=6. Based on these parameters, the device may fill columns of a table part 310-*a* according to ascending index values of the P base sequences. For example, the group 305-*a* may include base sequences with index values from 0 to 5. The device may then fill columns of a table part 310-*b* using index values from rows of the table part 310-*a*. For example, the group 305-*f* may include base sequences with index values 0, 6, 12, 18, 24, and 1, which correspond to the index values in the first row of the table part 310-*a* and the first index value in the second row.

FIG. 3B illustrates an example of a hopping pattern table 300-*b* for determining base sequence groups 305. As shown in the example FIG. 3B, the pool of base sequences may include P=30 base sequences, with index values from 0 to 29. The network may configure the hopping pattern reuse factor as K=8, and the device may determine the group size is L=8. Based on these parameters, the device may fill columns of a table part 310-*c* according to ascending index values of the P base sequences. For example, the group 305-*k* may include base sequences with index values from 0 to 7. In some cases, such as when the quotient P/L is not an integer, remaining entries of the table part 310-*c* may be filled with block interleaved entries corresponding to index values from rows of the table part 310-*c*. For example, two entries of the group 305-*n* may be filled with index values 0 and 8, which correspond to the first two index values of the first row of the table part 310-*c*. The device may then fill columns of a table part 310-*d* using index values from rows of the table part 310-*c*. For example, the group 305-*o* may include base sequences with index values 16, 24, 1, 9, 17, 25, 2, and 10, which correspond to the index values of the first row of the table part 310-*c* following the two index values used in the group 305-*n*, along with the index values of the second row of the table part 310-*c* and the first two index values of the third row. In addition, two entries of the group 305-*r* may be filled with the index values 16 and 18, which correspond to the first two index values of the first row of the table part 310-*d*.

By filling a hopping pattern table 300 to determine groups of base sequences as described herein, a probability of a collision may be reduced by decreasing an overlap of base sequences between groups 305. For example, the group 305-*b* includes six base sequences distinct from the six base sequences in the group 305-*a*, while the group 305-*f* includes two of the six base sequences in the group 305-*a*. That is, UL messages from a first UE in a cell assigned the group 305-*a* and UL messages from a second UE in a cell assigned the group 305-*b* may have a lower probability of collision than if each cell randomly selected a base sequence from the pool of base sequences.

Figure 4:
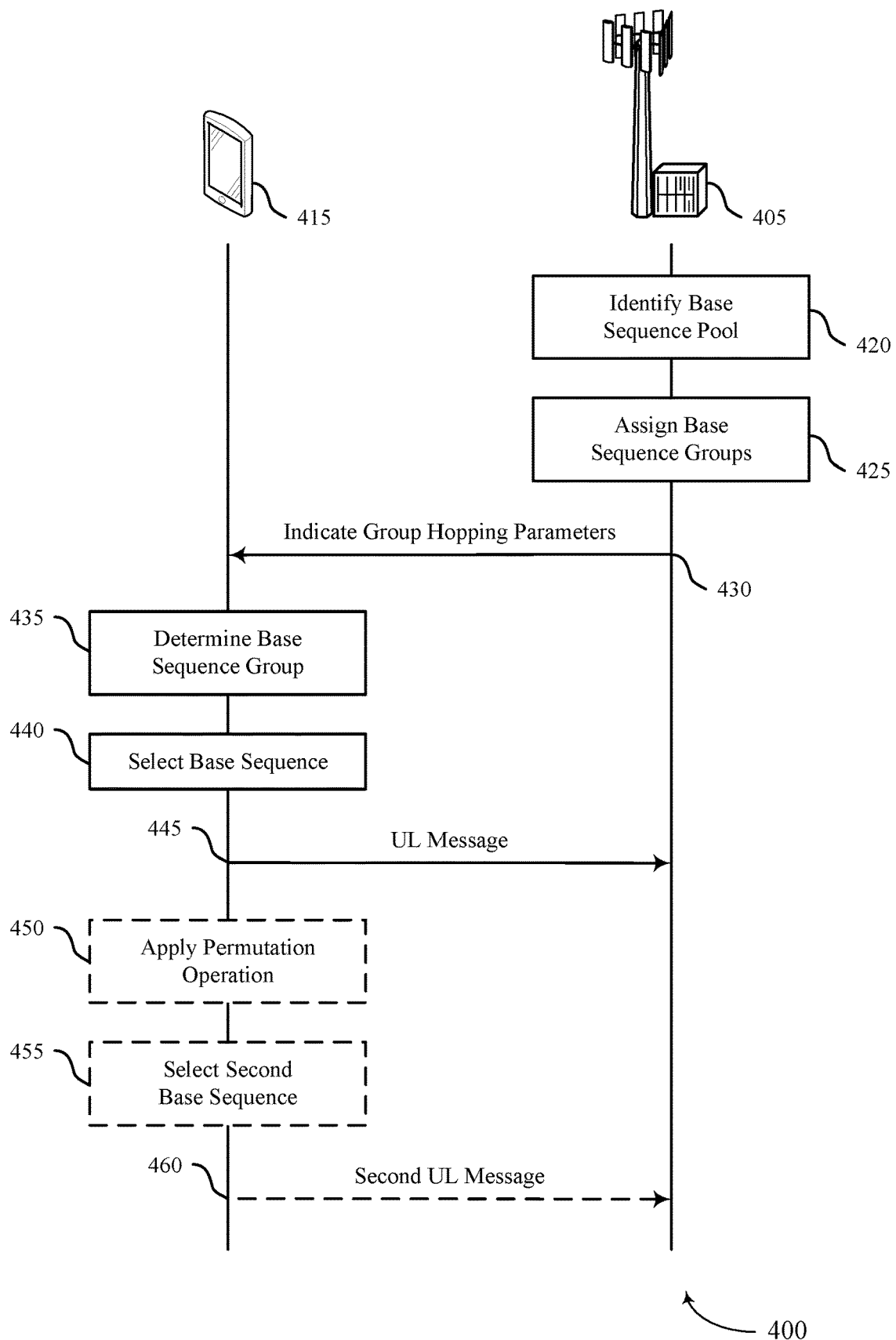
FIG. 4 illustrates an example of a process flow that supports group hopping enhancement for base sequences in accordance with aspects of the present disclosure.

FIG. 4 illustrates an example of a process flow 400 that supports group hopping enhancement for base sequences in accordance with aspects of the present disclosure. In some examples, process flow 400 may implement aspects of wireless communication systems 100 and 200. For example, the process flow 400 may include a base station 405 and a UE 415, which may be examples of the corresponding devices described with reference to FIGS. 1 and 2. In the following description of the process flow 400, the operations between the base station 405 and the UE 415 may be transmitted in a different order than the example order shown, or the operations performed by the base station 405 and the UE 415 may be performed in different orders or at different times. Some operations may also be omitted from the process flow 400, and other operations may be added to the process flow 400. The operations performed by the base station 405 and the UE 415 may support improvement to the UE 415 UL transmission operations and, in some examples, may promote improvements to the UE 415 reliability, among other benefits.

At 420, the base station 405 may identify a pool of distinct base sequences for UL messages from UEs including the UE 415. Each base sequence in the pool of base sequences may have a PAPR below a threshold to facilitate consistent and efficient channel estimation. In some examples, the pool of base sequences may be configured by the network (e.g., via higher-layer signaling). The pool of base sequences may include Zadoff-Chu sequences, chirp sequences, Gold sequences, computer generated search sequences, other sequences, or a combination thereof.

At 425, the base station 405 may assign the pool of base sequences into groups of base sequences, where each group of base sequences corresponds to a cell identifier (e.g., a PCID or a VCID) of a cell associated with the base station 405. Each group of base sequences may be assigned to a cell index (e.g., a hopping pattern index) corresponding to a cell identifier. In some examples, a group of base sequences may correspond to multiple cell identifiers. For example, if a distance between two cells is greater than a threshold, and a corresponding probability of inter-cell interference is low, cell identifiers associated with the two cells may correspond to a same group of base sequences.

In some examples, the base station may assign the pool of base sequences into groups of base sequences based on constructing a hopping pattern table associated with the pool of base sequences. The number of rows of the hopping pattern table may correspond to a group size, which may correspond to a number of indexes in each group of base sequences. The number of columns of the hopping pattern table may be correspond to a hopping pattern reuse factor configured by the network (e.g., via higher-layer signaling). The hopping pattern reuse factor may be determined by the network based on a density of cells within a geographic area. The base station 405 may assign the pool of base sequences into groups of base sequences by filling columns of a first part of the hopping pattern table according to ascending index values of the pool of base sequences, then filling columns of a second part of the hopping pattern table using a block interleaving pattern, where the index values in rows of the first part of the hopping pattern table are used to fill columns in the second part of the hopping pattern table. Each column of the table may correspond to a group assigned to a cell index.

At 430, the base station 405 may transmit signaling to the UE 415 indicating group hopping parameters for the pool of base sequences. The group hopping parameters may include the group size and the cell index assigned to the UE 415. In some examples, the base station 405 may transmit the group hopping parameters in a system information message.

At 435, the UE 415 may determine the groups of base sequences from the pool of base sequences. In some examples, the UE 415 may determine the groups of base sequences based on constructing the hopping pattern table associated with the pool of base sequences. In some examples, the UE 415 may construct the hopping pattern table based on the group size, the hopping patter reuse factor, and the size of the pool of base sequences. The UE 415 may determine the group of base sequences assigned to the UE 415 based on the cell index assigned to the UE 415.

At 440, the UE 415 may select a base sequence from the group of base sequences for transmitting a UL message to the base station 405. The group of base sequences may correspond to an identified cell identifier associated with a cell. In some examples, the UE 415 may select the base sequence by retrieving the base sequence from a lookup table at the UE 415. The lookup table may be determined based on the hopping pattern table, or may be signaled by the network.

At 445, the UE 415 may transmit a UL message to the base station 405 based on the selected base sequence. The UE 415 may transmit the UL message on the cell associated with the identified cell identifier. In some examples, the UL message may be a grant free message. In some examples, the UE 415 may transmit the UL message over a first OFDM symbol or in a first transmission opportunity.

In some examples, at 450, the UE 415 may apply a permutation operation or a cyclic shift to base sequences in the group of base sequences. In some examples, the UE 415 may transmit UL messages over multiple OFDM symbols or multiple transmission opportunities. The UL messages in subsequent transmission opportunities may include permuted or cyclically shifted versions of the base sequence used for the first transmission opportunity. The UE 415 may determine a group of base sequences for a subsequent UL message based on the permutation operation or the cyclic shift. For example, the UE 415 may generate a sorted list of base sequences for use with subsequent UL messages based on the permutation operation or the cyclic shift. The base station 405 may additionally apply the permutation operation or the cyclic shift to determine the sorted list of base sequences the UE 415 may use for subsequent UL messages.

In some examples, at 455 the UE 415 may select a second base sequence for a second UL message. The UE 415 may select the second base sequence from the sorted list of base sequences. In some examples, the second base sequence may be a permuted or cyclically shifted version of the base sequence use for the first UL message.

In some examples, at 460 the UE 415 may transmit the second UL message to the base station 405. The UE 415 may transmit the second UL message in a second OFDM symbol or in a second transmission opportunity. The UL message may be transmitted using the second base sequence.

The operations performed by the base station 405 and the UE 415 may therefore support improvements to the UE 415 UL transmission operations and, in some examples, may promote improvements to the UE 415 reliability, among other benefits.

Figure 5:
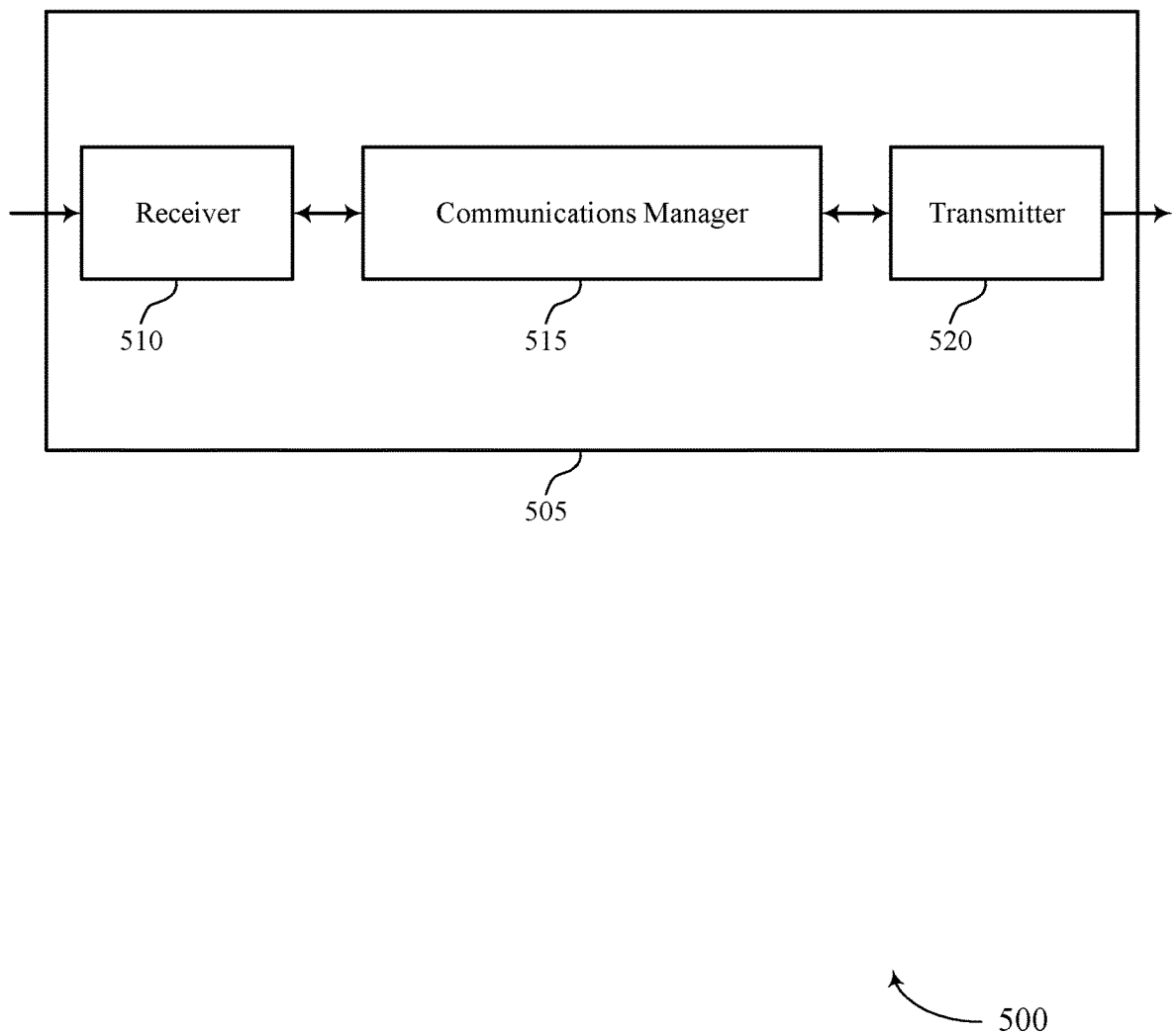
FIGS. 5 and 6 show block diagrams of devices that support group hopping enhancement for base sequences in accordance with aspects of the present disclosure.

FIG. 5 shows a block diagram 500 of a device 505 that supports group hopping enhancement for base sequences in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to group hopping enhancement for base sequences, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a message indicating a group size and a hopping pattern index, where the group size corresponds to a size of a set of groups of a pool of distinct base sequences having a PAPR below a threshold, and where the hopping pattern index corresponds to a cell identifier of a set of cell identifiers, select a base sequence from a group of the set of groups indicated by the hopping pattern index, where the group corresponds to an identified cell identifier of the set of cell identifiers, and transmit a UL message based on the selected base sequence on a cell corresponding to the identified cell identifier.

The communications manager 515 as described herein may be implemented to realize one or more potential advantages. One implementation may allow the device 505 to save power and increase battery life by communicating with a base station 105 (as shown in FIG. 1) more efficiently. For example, the device 505 may efficiently transmit UL information to a base station 105 in a grant free UL message, as the device 505 may be able to reconfigure UL transmission processes and select a base sequence from the determined group of base sequences to successfully transmit the UL message while avoiding a collision with another UL message. Another implementation may promote low latency communications at the device 505, as a number of resources allocated to signaling overhead and UL transmission may be reduced. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
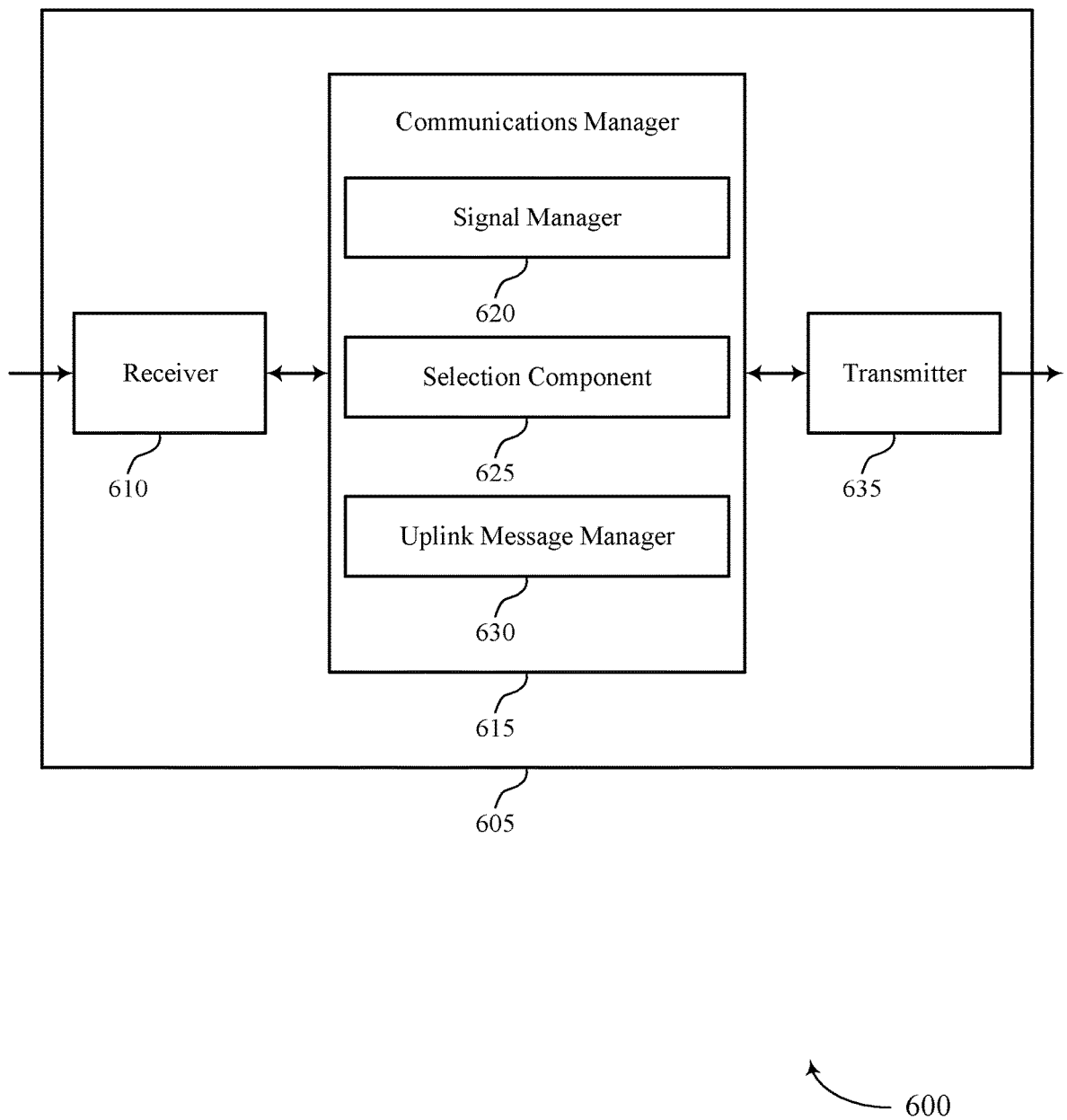

FIG. 6 shows a block diagram 600 of a device 605 that supports group hopping enhancement for base sequences in accordance with aspects of the present disclosure. The device 605 may be an example of aspects of a device 505, or a UE 115 as described herein.

The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to group hopping enhancement for base sequences, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a signal manager 620, a selection component 625, and a UL message manager 630. The communications manager 615 may be an example of aspects of the communications manager 810 described herein.

The signal manager 620 may receive a message indicating a group size and a hopping pattern index, where the group size corresponds to a size of a set of groups of a pool of distinct base sequences having a PAPR below a threshold, and where the hopping pattern index corresponds to a cell identifier of a set of cell identifiers.

The selection component 625 may select a base sequence from a group of the set of groups indicated by the hopping pattern index, where the group corresponds to an identified cell identifier of the set of cell identifiers.

The UL message manager 630 may transmit a UL message based on the selected base sequence on a cell corresponding to the identified cell identifier.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
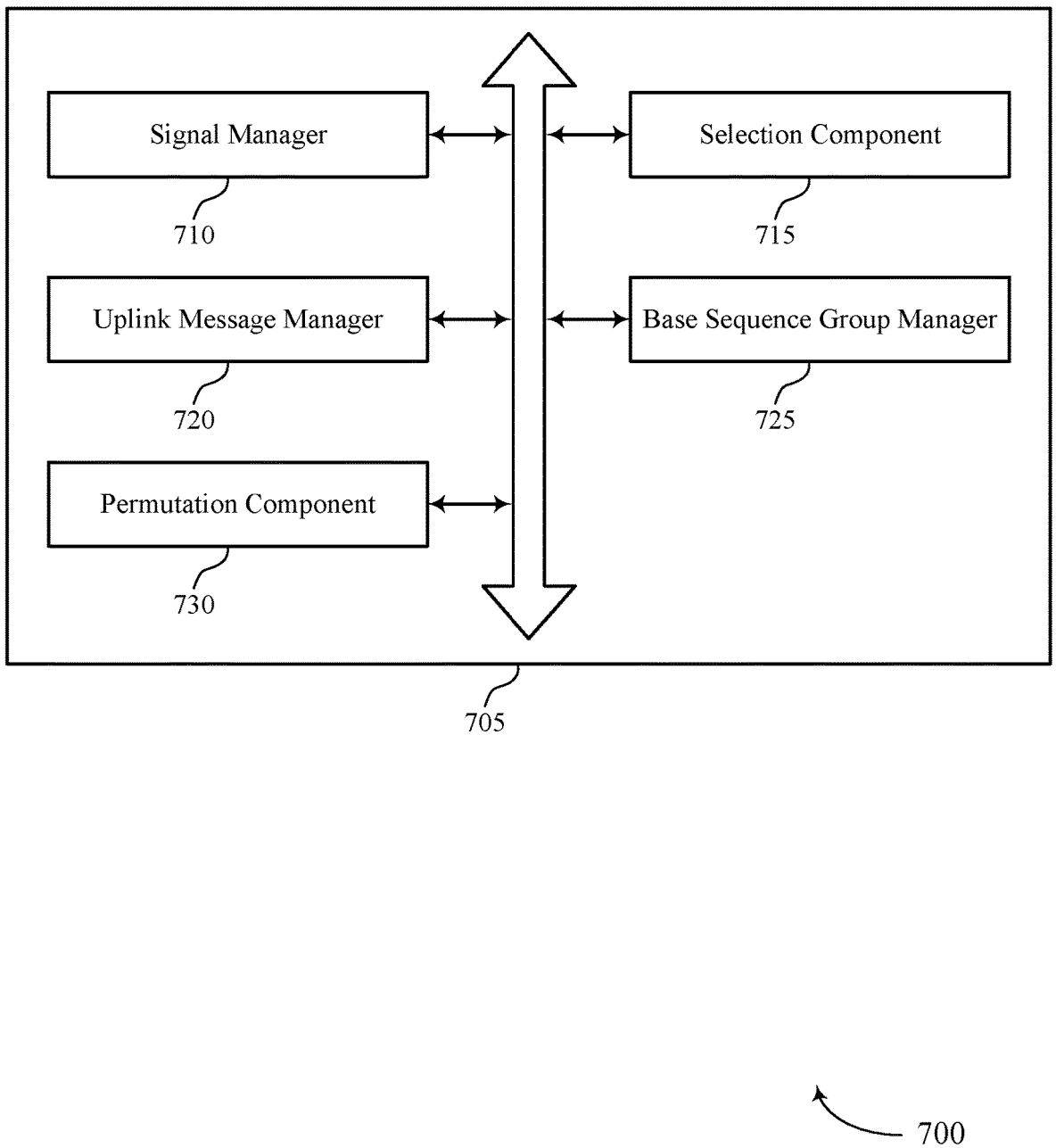
FIG. 7 shows a block diagram of a communications manager that supports group hopping enhancement for base sequences in accordance with aspects of the present disclosure.

FIG. 7 shows a block diagram 700 of a communications manager 705 that supports group hopping enhancement for base sequences in accordance with aspects of the present disclosure. The communications manager 705 may be an example of aspects of a communications manager 515, a communications manager 615, or a communications manager 810 described herein. The communications manager 705 may include a signal manager 710, a selection component 715, a UL message manager 720, a base sequence group manager 725, and a permutation component 730. Each of these modules may communicate, directly or indirectly, with one another (e.g., via one or more buses).

The signal manager 710 may receive a message indicating a group size and a hopping pattern index, where the group size corresponds to a size of a set of groups of a pool of distinct base sequences having a PAPR below a threshold, and where the hopping pattern index corresponds to a cell identifier of a set of cell identifiers. In some cases, the message indicating the group size and the hopping pattern index includes a system information message.

The selection component 715 may select a base sequence from a group of the set of groups indicated by the hopping pattern index, where the group corresponds to an identified cell identifier of the set of cell identifiers. In some examples, the selection component 715 may select a second base sequence from the sorted list of base sequences. In some examples, the selection component 715 may retrieve the base sequence from a look up table at the UE. In some cases, the pool of distinct base sequences having a PAPR below a threshold includes Zadoff-Chu sequences, computer generated search sequences, chirp sequences, Gold sequences, or a combination thereof.

The UL message manager 720 may transmit a UL message based on the selected base sequence on a cell corresponding to the identified cell identifier. In some examples, the UL message manager 720 may transmit the UL message using the selected base sequence over a first symbol. In some examples, the UL message manager 720 may transmit a second UL message using the second base sequence over a second symbol. In some cases, the UL message may include a grant-free message.

The base sequence group manager 725 may assign the pool of distinct base sequences into the set of groups based on the group size, a hopping pattern reuse factor, and a size of the pool. In some examples, the base sequence group manager 725 may construct a table having a row length corresponding to the hopping pattern reuse factor and a column length corresponding to the group size, where each column of the table corresponds to a hopping pattern index of a set of hopping pattern indexes and a group of the set of groups. In some examples, the base sequence group manager 725 may fill columns of a first part of the table according to ascending index values of the pool of distinct base sequences. In some examples, filling columns of a second part of the table according to a block interleaving pattern with respect to the first part of the table, where the block interleaving pattern includes filling the columns of the second part of the table using index values from rows of the first part of the table.

The permutation component 730 may apply a permutation operation or a cyclic shift to one or more base sequences of the group corresponding to the identified cell identifier. In some examples, the permutation component 730 may generate a sorted list of base sequences based on the permutation operation or the cyclic shift.

Figure 8:
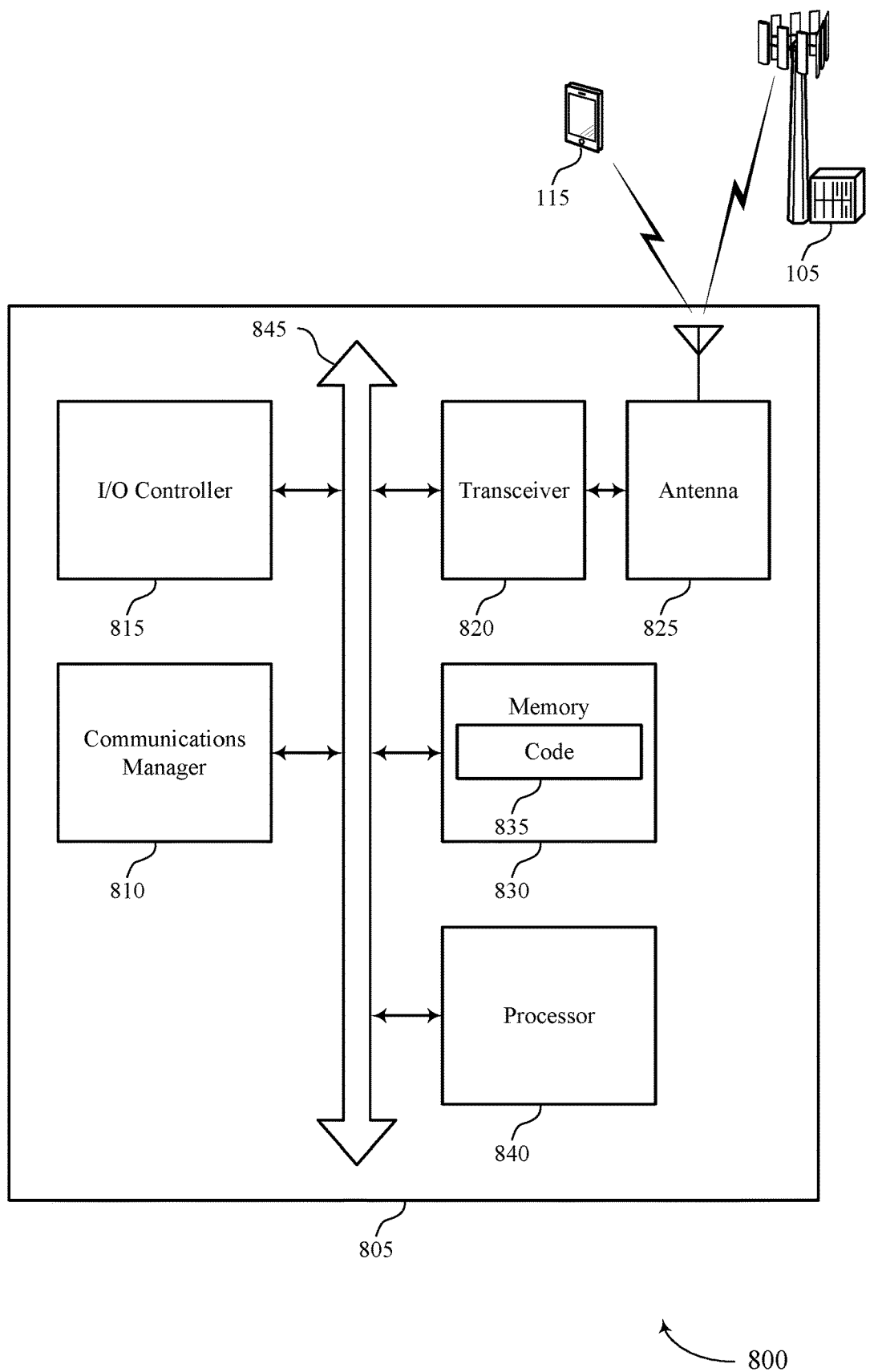
FIG. 8 shows a diagram of a system including a device that supports group hopping enhancement for base sequences in accordance with aspects of the present disclosure.

FIG. 8 shows a diagram of a system 800 including a device 805 that supports group hopping enhancement for base sequences in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a message indicating a group size and a hopping pattern index, where the group size corresponds to a size of a set of groups of a pool of distinct base sequences having a PAPR below a threshold, and where the hopping pattern index corresponds to a cell identifier of a set of cell identifiers, select a base sequence from a group of the set of groups indicated by the hopping pattern index, where the group corresponds to an identified cell identifier of the set of cell identifiers, and transmit a UL message based on the selected base sequence on a cell corresponding to the identified cell identifier.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting group hopping enhancement for base sequences).

The processor 840 of the device 805 (e.g., controlling the receiver 1110, the transmitter 1120, or the transceiver 820) may reduce power consumption and increase UL transmission reliability based on determining the group of base sequences to use for transmitting UL messages. In some examples, the processor 840 of the device 805 may reconfigure parameters for transmitting the UL message. For example, the processor 840 of the device 805 may turn on one or more processing units for performing a UL transmission, increase a processing clock, or a similar mechanism within the device 805. As such, when subsequent UL transmissions are required, the processor 840 may be ready to respond more efficiently through the reduction of a ramp up in processing power. The improvements in power saving and UL transmission reliability may further increase battery life at the device 805 (for example, by reducing or eliminating unnecessary or failed UL transmissions, etc.).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
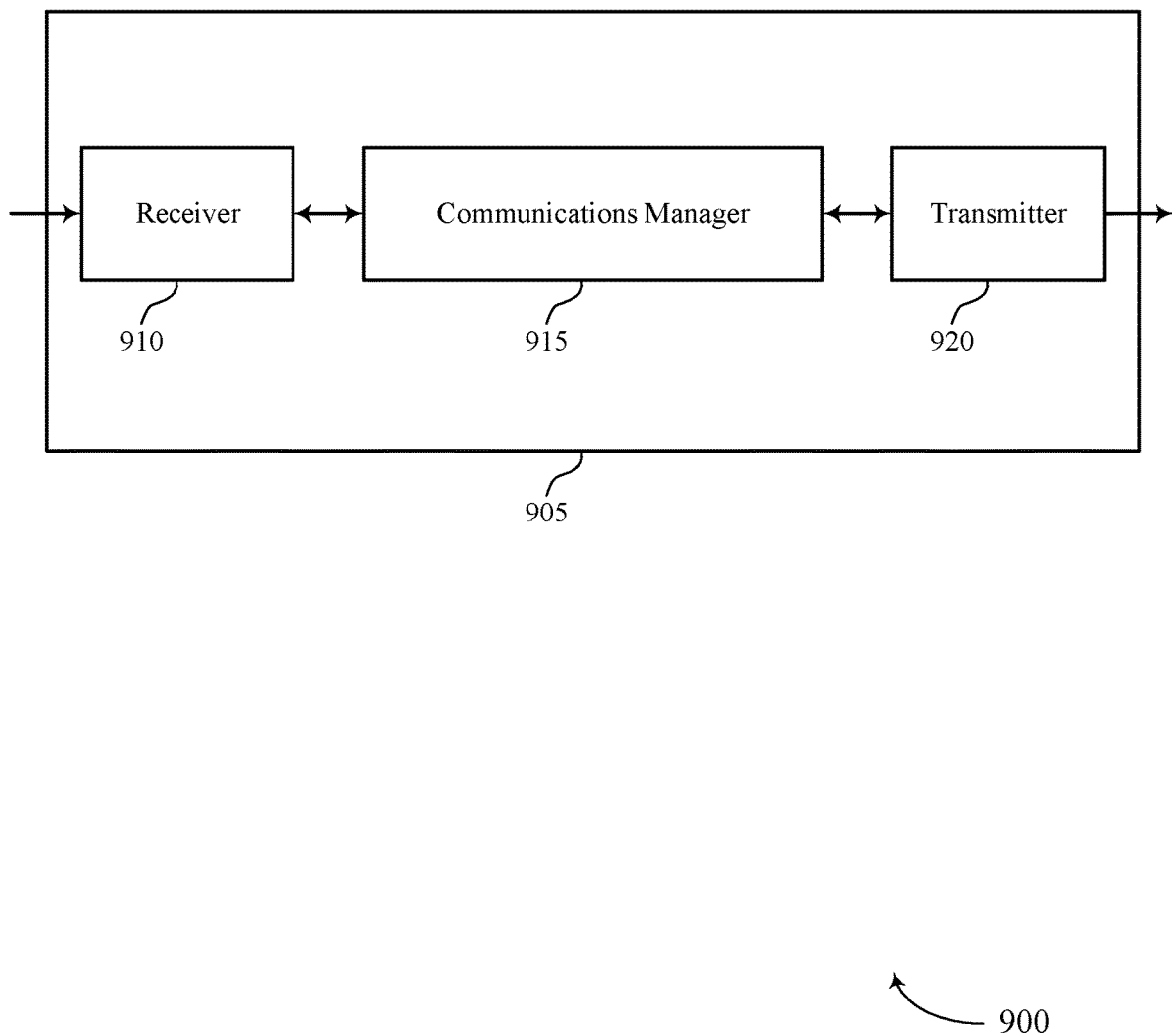
FIGS. 9 and 10 show block diagrams of devices that support group hopping enhancement for base sequences in accordance with aspects of the present disclosure.

FIG. 9 shows a block diagram 900 of a device 905 that supports group hopping enhancement for base sequences in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for group hopping enhancement for base sequences). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a pool of distinct base sequences having a PAPR below a threshold, assign the pool of distinct base sequences into a set of groups, where each group of the set of groups corresponds to a cell identifier of a set of cell identifiers, and transmit a message indicating a group size and a hopping pattern index, where the group size corresponds to a size of the set of groups and the hopping pattern index corresponds to an identified cell identifier of the set of cell identifiers.

The communications manager 915 as described herein may be implemented to realize one or more potential advantages. One implementation may allow the device 905 to save power by communicating with a UE 115 (as shown in FIG. 1) more efficiently. For example, the device 905 may reduce signaling overhead in communications with a UE 115, as the device 905 may be able to signal the group size and the hopping pattern index to increase the likelihood of the UE 115 successfully transmitting a UL message to the device 905 without explicitly signaling the assigned base sequences. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
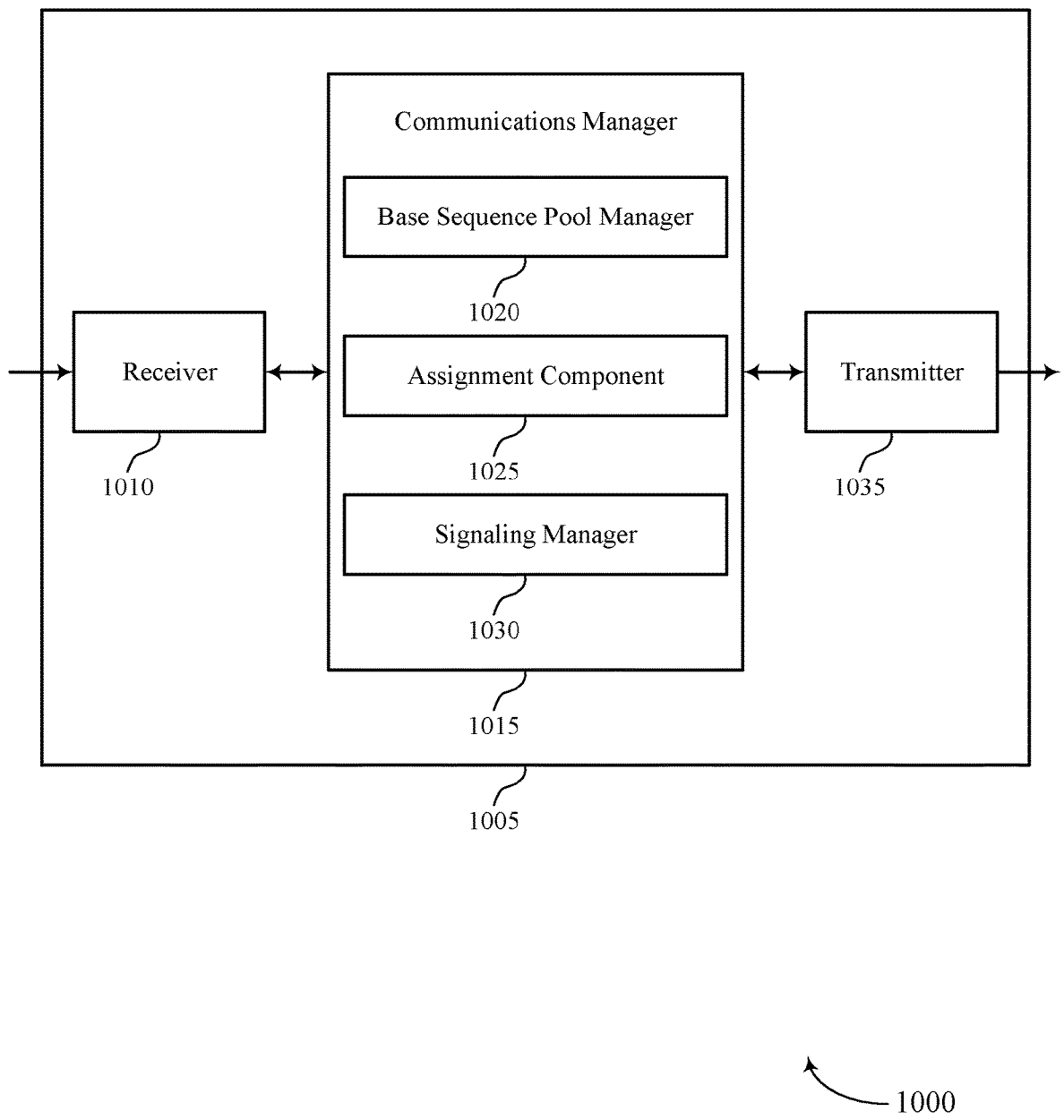

FIG. 10 shows a block diagram 1000 of a device 1005 that supports group hopping enhancement for base sequences in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to group hopping enhancement for base sequences, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a base sequence pool manager 1020, an assignment component 1025, and a signaling manager 1030. The communications manager 1015 may be an example of aspects of the communications manager 1210 described herein.

The base sequence pool manager 1020 may identify a pool of distinct base sequences having a PAPR below a threshold.

The assignment component 1025 may assign the pool of distinct base sequences into a set of groups, where each group of the set of groups corresponds to a cell identifier of a set of cell identifiers.

The signaling manager 1030 may transmit a message indicating a group size and a hopping pattern index, where the group size corresponds to a size of the set of groups and the hopping pattern index corresponds to an identified cell identifier of the set of cell identifiers.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
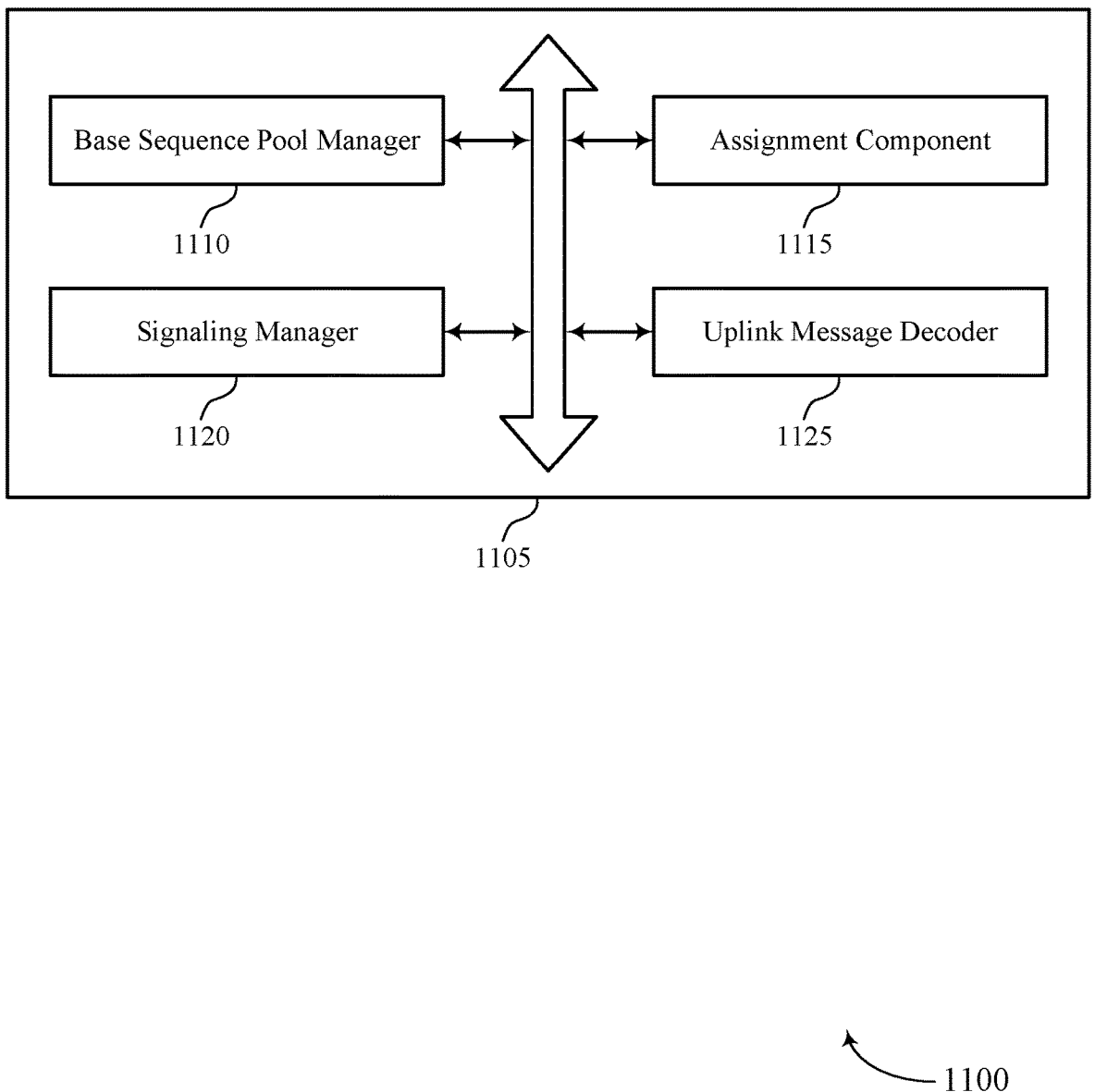
FIG. 11 shows a block diagram of a communications manager that supports group hopping enhancement for base sequences in accordance with aspects of the present disclosure.

FIG. 11 shows a block diagram 1100 of a communications manager 1105 that supports group hopping enhancement for base sequences in accordance with aspects of the present disclosure. The communications manager 1105 may be an example of aspects of a communications manager 915, a communications manager 1015, or a communications manager 1210 described herein. The communications manager 1105 may include a base sequence pool manager 1110, an assignment component 1115, a signaling manager 1120, and a UL message decoder 1125. Each of these modules may communicate, directly or indirectly, with one another (e.g., via one or more buses).

The base sequence pool manager 1110 may identify a pool of distinct base sequences having a PAPR below a threshold. In some examples, the base sequence pool manager 1110 may apply a permutation operation or a cyclic shift to one or more base sequences of a group of the set of groups corresponding to the identified cell identifier. In some examples, the base sequence pool manager 1110 may generate a sorted list of base sequences based on the permutation operation or the cyclic shift. In some cases, the pool of distinct base sequences having a PAPR below a threshold includes Zadoff-Chu sequences, computer generated search sequences, chirp sequences, Gold sequences, or a combination thereof.

The assignment component 1115 may assign the pool of distinct base sequences into a set of groups, where each group of the set of groups corresponds to a cell identifier of a set of cell identifiers. In some examples, the assignment component 1115 may assign the pool of distinct base sequences into the set of groups based on the group size, a hopping pattern reuse factor, and a size of the pool. In some examples, the assignment component 1115 may construct a table having a row length corresponding to the hopping pattern reuse factor and a column length corresponding to the group size, where each column of the table corresponds to a group of the set of groups. In some examples, the assignment component 1115 may fill columns of a first part of the table according to ascending index values of the pool of distinct base sequences. In some examples, filling columns of a second part of the table according to a block interleaving pattern with respect to the first part of the table, where the block interleaving pattern includes filling the columns of the second part of the table using index values from rows of the first part of the table.

The signaling manager 1120 may transmit a message indicating a group size and a hopping pattern index, where the group size corresponds to a size of the set of groups and the hopping pattern index corresponds to an identified cell identifier of the set of cell identifiers. In some cases, the message indicating the group size and the hopping pattern index includes a system information message.

The UL message decoder 1125 may receive a UL message on an identified cell associated with the identified cell identifier over a first symbol, where the UL message is based on a base sequence selected from the group corresponding to the identified cell identifier. In some examples, the UL message decoder 1125 may receive a second UL message over a second symbol, where the second UL message is based on a second base sequence selected from the sorted list of base sequences.

Figure 12:
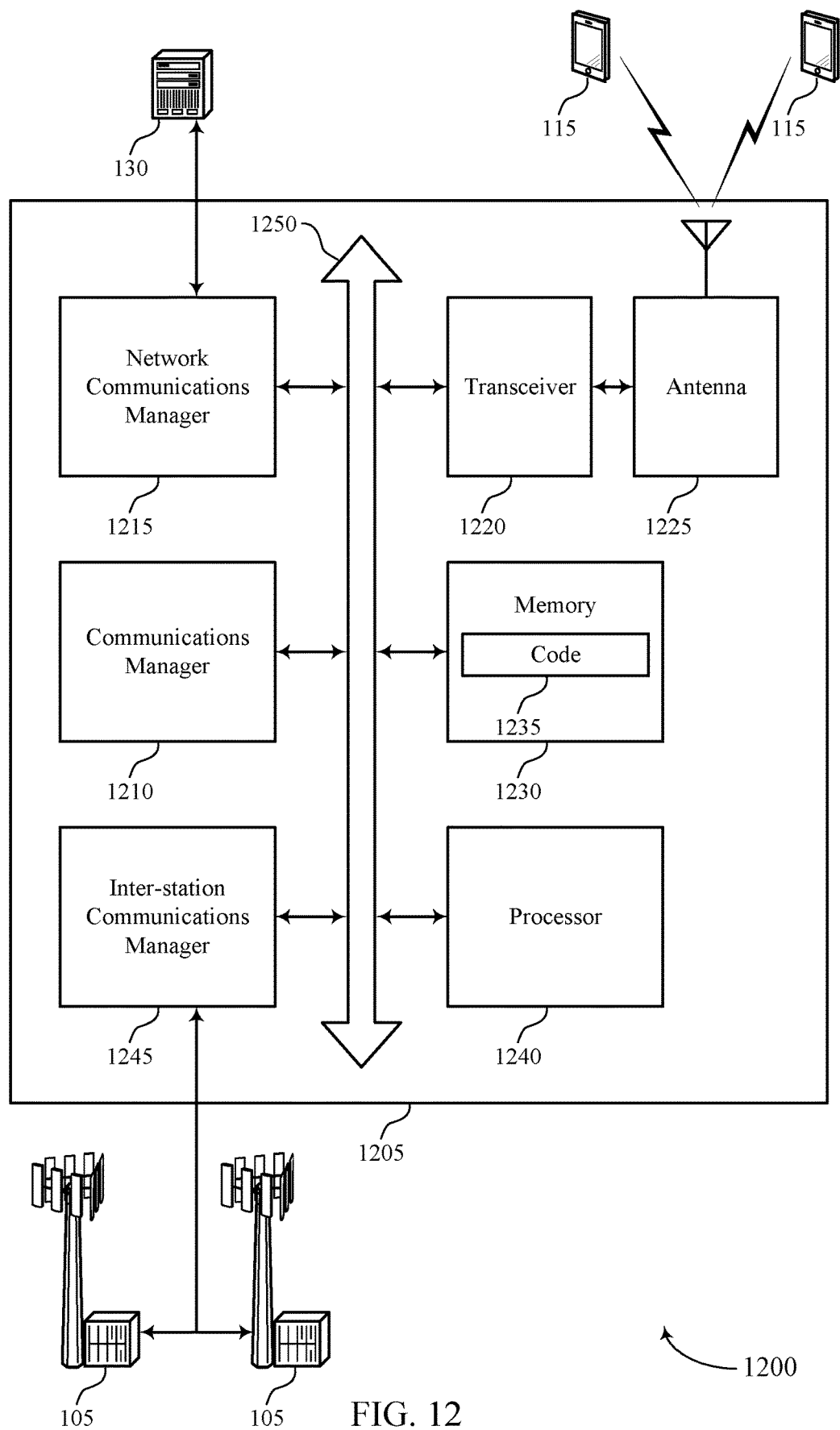
FIG. 12 shows a diagram of a system including a device that supports group hopping enhancement for base sequences in accordance with aspects of the present disclosure.

FIG. 12 shows a diagram of a system 1200 including a device 1205 that supports group hopping enhancement for base sequences in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a pool of distinct base sequences having a PAPR below a threshold, assign the pool of distinct base sequences into a set of groups, where each group of the set of groups corresponds to a cell identifier of a set of cell identifiers, and transmit a message indicating a group size and a hopping pattern index, where the group size corresponds to a size of the set of groups and the hopping pattern index corresponds to an identified cell identifier of the set of cell identifiers.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting group hopping enhancement for base sequences).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
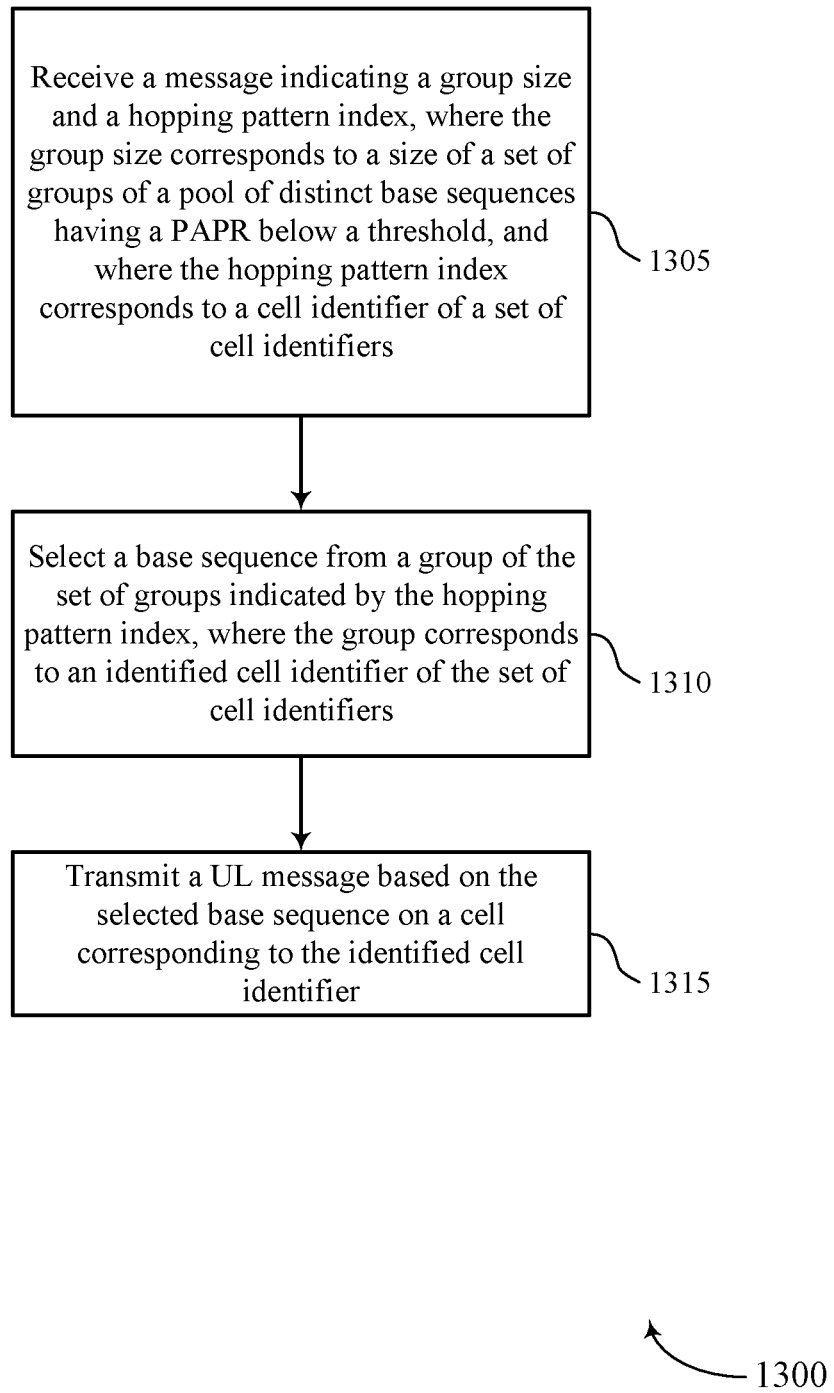
FIGS. 13 through 18 show flowcharts illustrating methods that support group hopping enhancement for base sequences in accordance with aspects of the present disclosure.

FIG. 13 shows a flowchart illustrating a method 1300 that supports group hopping enhancement for base sequences in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a message indicating a group size and a hopping pattern index, where the group size corresponds to a size of a set of groups of a pool of distinct base sequences having a PAPR below a threshold, and where the hopping pattern index corresponds to a cell identifier of a set of cell identifiers. The operations of 1305 may be performed according to the methods described herein. In some examples, aspects of the operations of 1305 may be performed by a signal manager as described with reference to FIGS. 5 through 8.

At 1310, the UE may select a base sequence from a group of the set of groups indicated by the hopping pattern index, where the group corresponds to an identified cell identifier of the set of cell identifiers. The operations of 1310 may be performed according to the methods described herein. In some examples, aspects of the operations of 1310 may be performed by a selection component as described with reference to FIGS. 5 through 8.

At 1315, the UE may transmit a UL message based on the selected base sequence on a cell corresponding to the identified cell identifier. The operations of 1315 may be performed according to the methods described herein. In some examples, aspects of the operations of 1315 may be performed by a UL message manager as described with reference to FIGS. 5 through 8.

Figure 14:
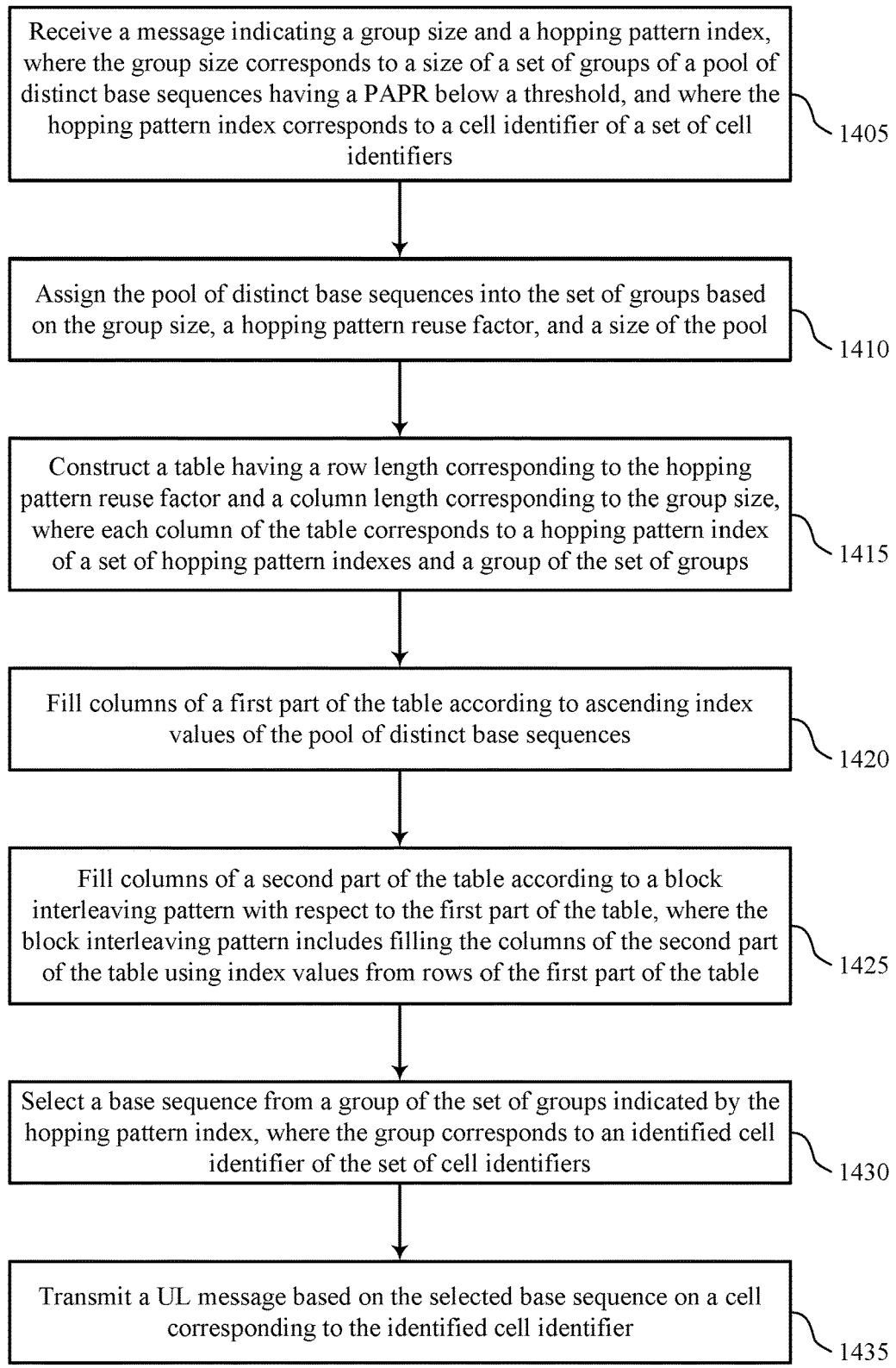

FIG. 14 shows a flowchart illustrating a method 1400 that supports group hopping enhancement for base sequences in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a message indicating a group size and a hopping pattern index, where the group size corresponds to a size of a set of groups of a pool of distinct base sequences having a PAPR below a threshold, and where the hopping pattern index corresponds to a cell identifier of a set of cell identifiers. The operations of 1405 may be performed according to the methods described herein. In some examples, aspects of the operations of 1405 may be performed by a signal manager as described with reference to FIGS. 5 through 8.

At 1410, the UE may assign the pool of distinct base sequences into the set of groups based on the group size, a hopping pattern reuse factor, and a size of the pool. The operations of 1410 may be performed according to the methods described herein. In some examples, aspects of the operations of 1410 may be performed by a base sequence group manager as described with reference to FIGS. 5 through 8.

At 1415, the UE may construct a table having a row length corresponding to the hopping pattern reuse factor and a column length corresponding to the group size, where each column of the table corresponds to a hopping pattern index of a set of hopping pattern indexes and a group of the set of groups. The operations of 1415 may be performed according to the methods described herein. In some examples, aspects of the operations of 1415 may be performed by a base sequence group manager as described with reference to FIGS. 5 through 8.

At 1420, the UE may fill columns of a first part of the table according to ascending index values of the pool of distinct base sequences. The operations of 1420 may be performed according to the methods described herein. In some examples, aspects of the operations of 1420 may be performed by a base sequence group manager as described with reference to FIGS. 5 through 8.

At 1425, the UE may fill columns of a second part of the table according to a block interleaving pattern with respect to the first part of the table, where the block interleaving pattern includes filling the columns of the second part of the table using index values from rows of the first part of the table. The operations of 1425 may be performed according to the methods described herein. In some examples, aspects of the operations of 1425 may be performed by a base sequence group manager as described with reference to FIGS. 5 through 8.

At 1430, the UE may select a base sequence from a group of the set of groups indicated by the hopping pattern index, where the group corresponds to an identified cell identifier of the set of cell identifiers. The operations of 1430 may be performed according to the methods described herein. In some examples, aspects of the operations of 1430 may be performed by a selection component as described with reference to FIGS. 5 through 8.

At 1435, the UE may transmit a UL message based on the selected base sequence on a cell corresponding to the identified cell identifier. The operations of 1435 may be performed according to the methods described herein. In some examples, aspects of the operations of 1435 may be performed by a UL message manager as described with reference to FIGS. 5 through 8.

Figure 15:
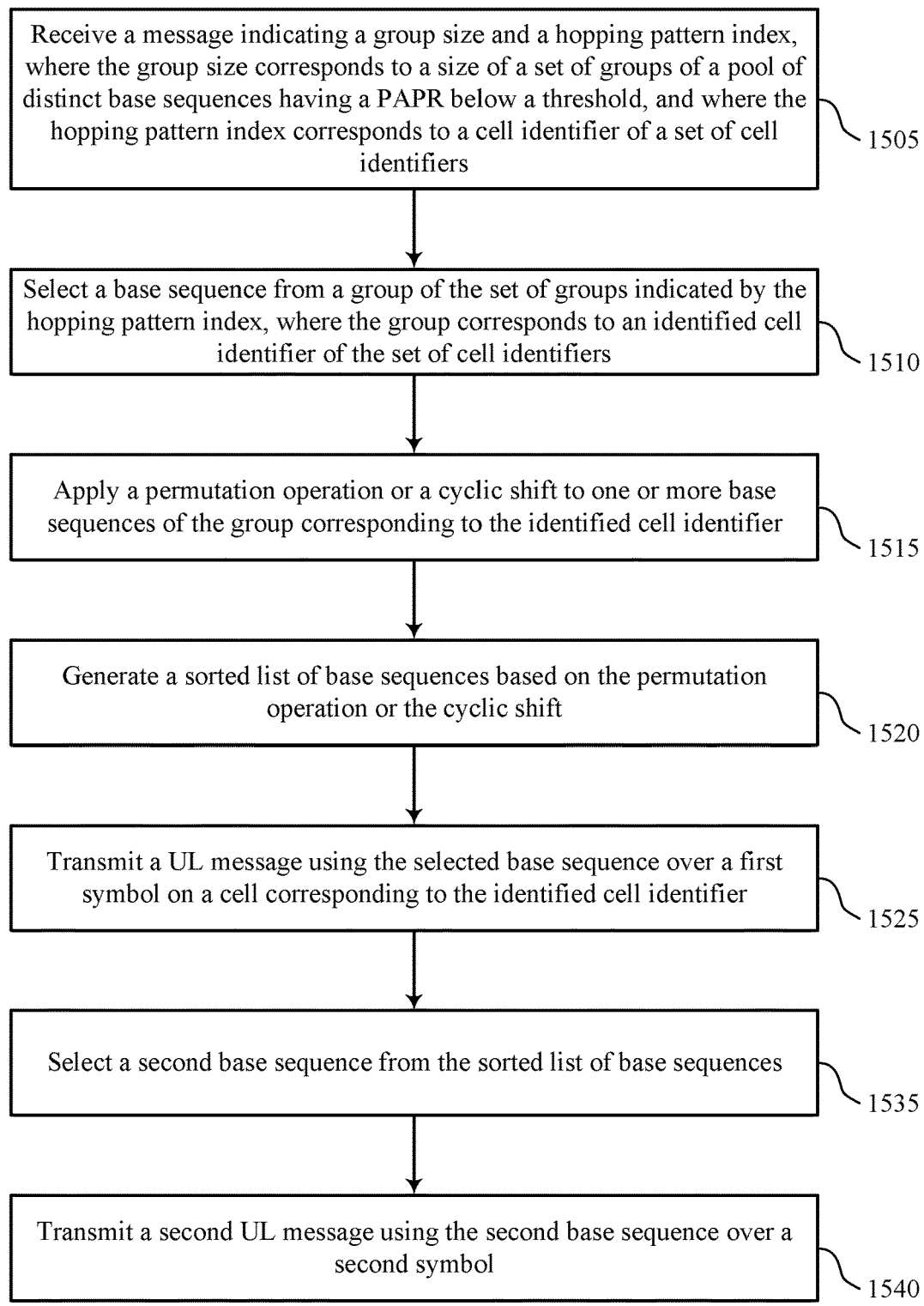

FIG. 15 shows a flowchart illustrating a method 1500 that supports group hopping enhancement for base sequences in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a message indicating a group size and a hopping pattern index, where the group size corresponds to a size of a set of groups of a pool of distinct base sequences having a PAPR below a threshold, and where the hopping pattern index corresponds to a cell identifier of a set of cell identifiers. The operations of 1505 may be performed according to the methods described herein. In some examples, aspects of the operations of 1505 may be performed by a signal manager as described with reference to FIGS. 5 through 8.

At 1510, the UE may select a base sequence from a group of the set of groups indicated by the hopping pattern index, where the group corresponds to an identified cell identifier of the set of cell identifiers. The operations of 1510 may be performed according to the methods described herein. In some examples, aspects of the operations of 1510 may be performed by a selection component as described with reference to FIGS. 5 through 8.

At 1515, the UE may apply a permutation operation or a cyclic shift to one or more base sequences of the group corresponding to the identified cell identifier. The operations of 1515 may be performed according to the methods described herein. In some examples, aspects of the operations of 1515 may be performed by a permutation component as described with reference to FIGS. 5 through 8.

At 1520, the UE may generate a sorted list of base sequences based on the permutation operation or the cyclic shift. The operations of 1520 may be performed according to the methods described herein. In some examples, aspects of the operations of 1520 may be performed by a permutation component as described with reference to FIGS. 5 through 8.

At 1525, the UE may transmit a UL message using the selected base sequence over a first symbol on a cell corresponding to the identified cell identifier. The operations of 1525 may be performed according to the methods described herein. In some examples, aspects of the operations of 1525 may be performed by a UL message manager as described with reference to FIGS. 5 through 8.

At 1535, the UE may select a second base sequence from the sorted list of base sequences. The operations of 1535 may be performed according to the methods described herein. In some examples, aspects of the operations of 1535 may be performed by a selection component as described with reference to FIGS. 5 through 8.

At 1540, the UE may transmit a second UL message using the second base sequence over a second symbol. The operations of 1540 may be performed according to the methods described herein. In some examples, aspects of the operations of 1540 may be performed by a UL message manager as described with reference to FIGS. 5 through 8.

Figure 16:
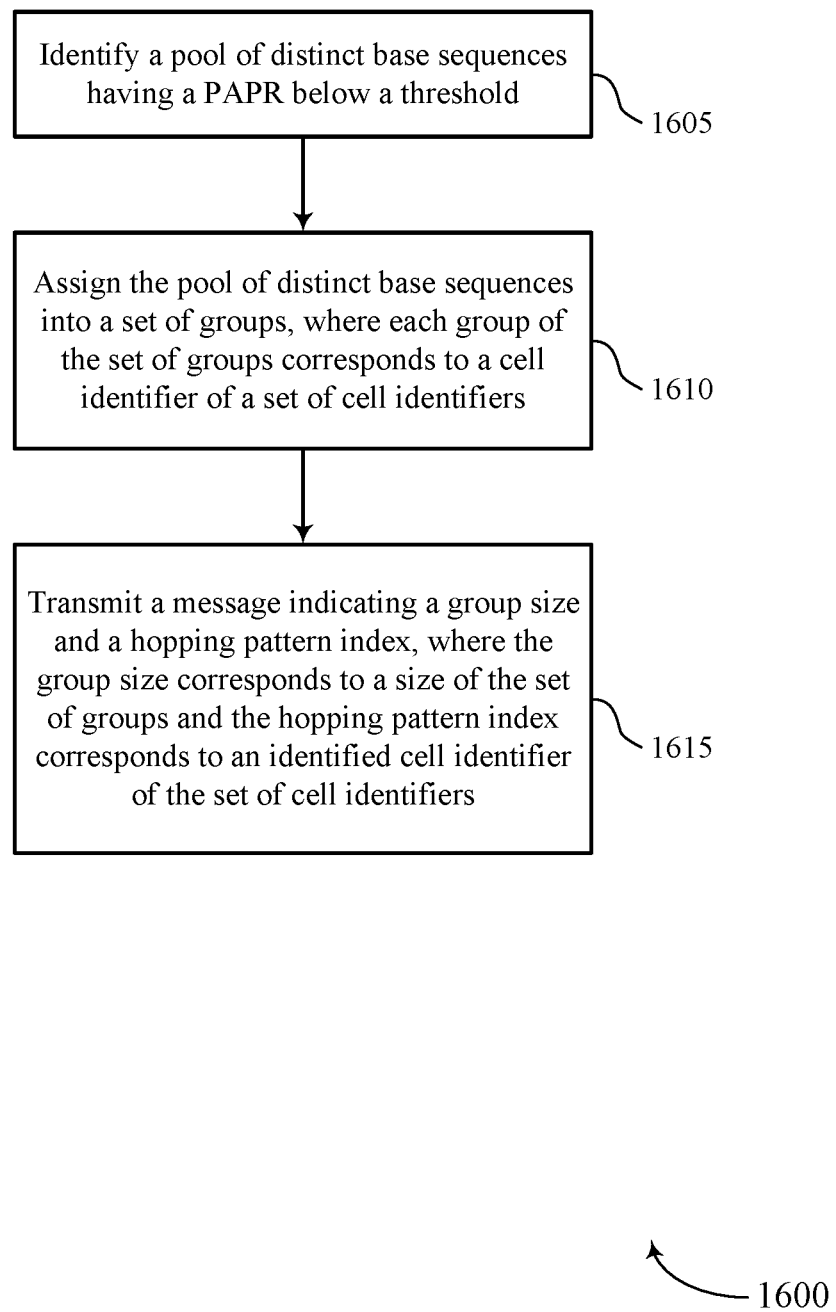

FIG. 16 shows a flowchart illustrating a method 1600 that supports group hopping enhancement for base sequences in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify a pool of distinct base sequences having a PAPR below a threshold. The operations of 1605 may be performed according to the methods described herein. In some examples, aspects of the operations of 1605 may be performed by a base sequence pool manager as described with reference to FIGS. 9 through 12.

At 1610, the base station may assign the pool of distinct base sequences into a set of groups, where each group of the set of groups corresponds to a cell identifier of a set of cell identifiers. The operations of 1610 may be performed according to the methods described herein. In some examples, aspects of the operations of 1610 may be performed by an assignment component as described with reference to FIGS. 9 through 12.

At 1615, the base station may transmit a message indicating a group size and a hopping pattern index, where the group size corresponds to a size of the set of groups and the hopping pattern index corresponds to an identified cell identifier of the set of cell identifiers. The operations of 1615 may be performed according to the methods described herein. In some examples, aspects of the operations of 1615 may be performed by a signaling manager as described with reference to FIGS. 9 through 12.

Figure 17:
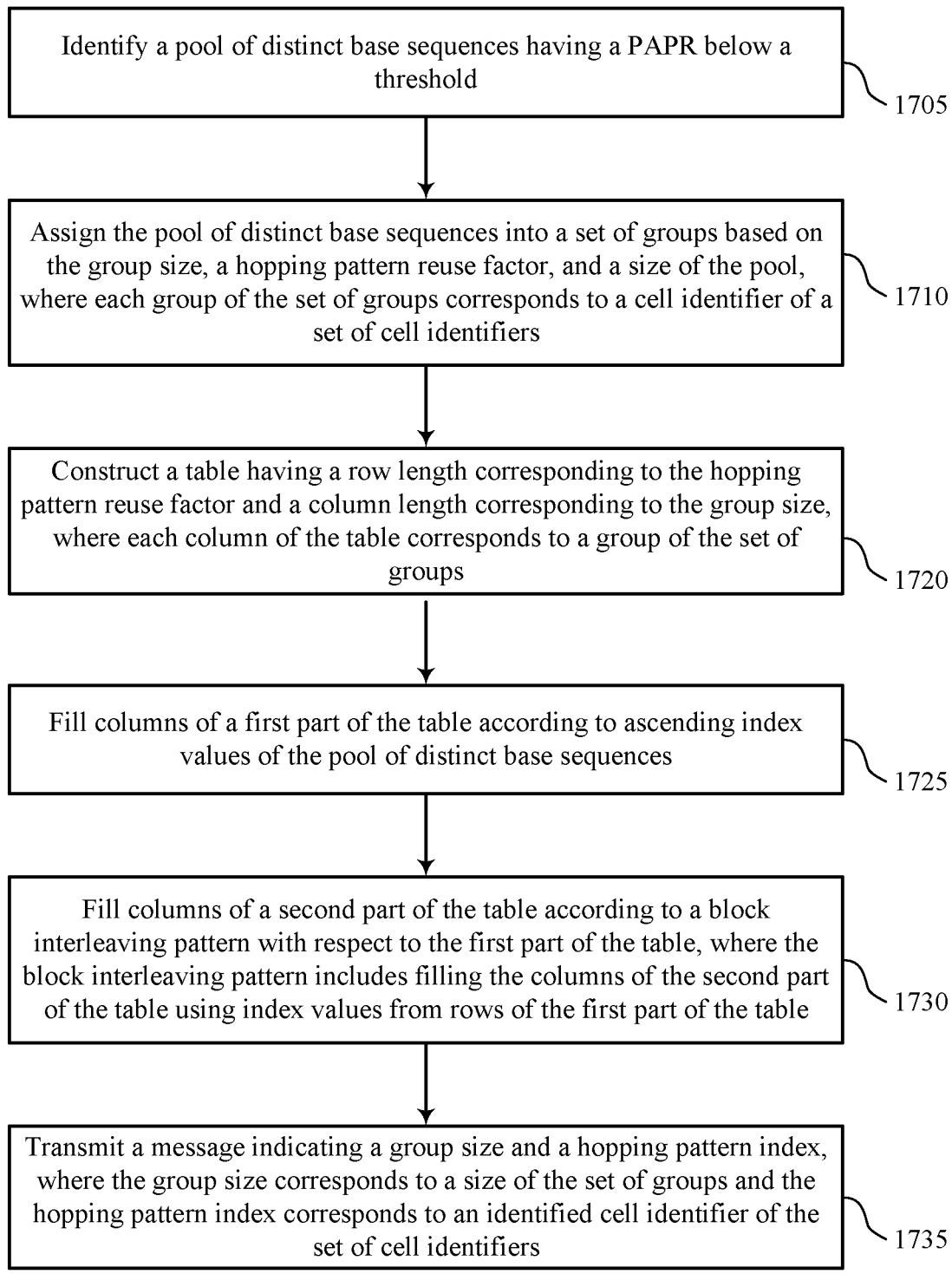

FIG. 17 shows a flowchart illustrating a method 1700 that supports group hopping enhancement for base sequences in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify a pool of distinct base sequences having a PAPR below a threshold. The operations of 1705 may be performed according to the methods described herein. In some examples, aspects of the operations of 1705 may be performed by a base sequence pool manager as described with reference to FIGS. 9 through 12.

At 1710, the base station may assign the pool of distinct base sequences into a set of groups based on the group size, a hopping pattern reuse factor, and a size of the pool, where each group of the set of groups corresponds to a cell identifier of a set of cell identifiers. The operations of 1710 may be performed according to the methods described herein. In some examples, aspects of the operations of 1710 may be performed by an assignment component as described with reference to FIGS. 9 through 12.

At 1720, the base station may construct a table having a row length corresponding to the hopping pattern reuse factor and a column length corresponding to the group size, where each column of the table corresponds to a group of the set of groups. The operations of 1720 may be performed according to the methods described herein. In some examples, aspects of the operations of 1720 may be performed by an assignment component as described with reference to FIGS. 9 through 12.

At 1725, the base station may fill columns of a first part of the table according to ascending index values of the pool of distinct base sequences. The operations of 1725 may be performed according to the methods described herein. In some examples, aspects of the operations of 1725 may be performed by an assignment component as described with reference to FIGS. 9 through 12.

At 1730, the base station may fill columns of a second part of the table according to a block interleaving pattern with respect to the first part of the table, where the block interleaving pattern includes filling the columns of the second part of the table using index values from rows of the first part of the table. The operations of 1730 may be performed according to the methods described herein. In some examples, aspects of the operations of 1730 may be performed by an assignment component as described with reference to FIGS. 9 through 12.

At 1735, the base station may transmit a message indicating a group size and a hopping pattern index, where the group size corresponds to a size of the set of groups and the hopping pattern index corresponds to an identified cell identifier of the set of cell identifiers. The operations of 1735 may be performed according to the methods described herein. In some examples, aspects of the operations of 1735 may be performed by a signaling manager as described with reference to FIGS. 9 through 12.

Figure 18:
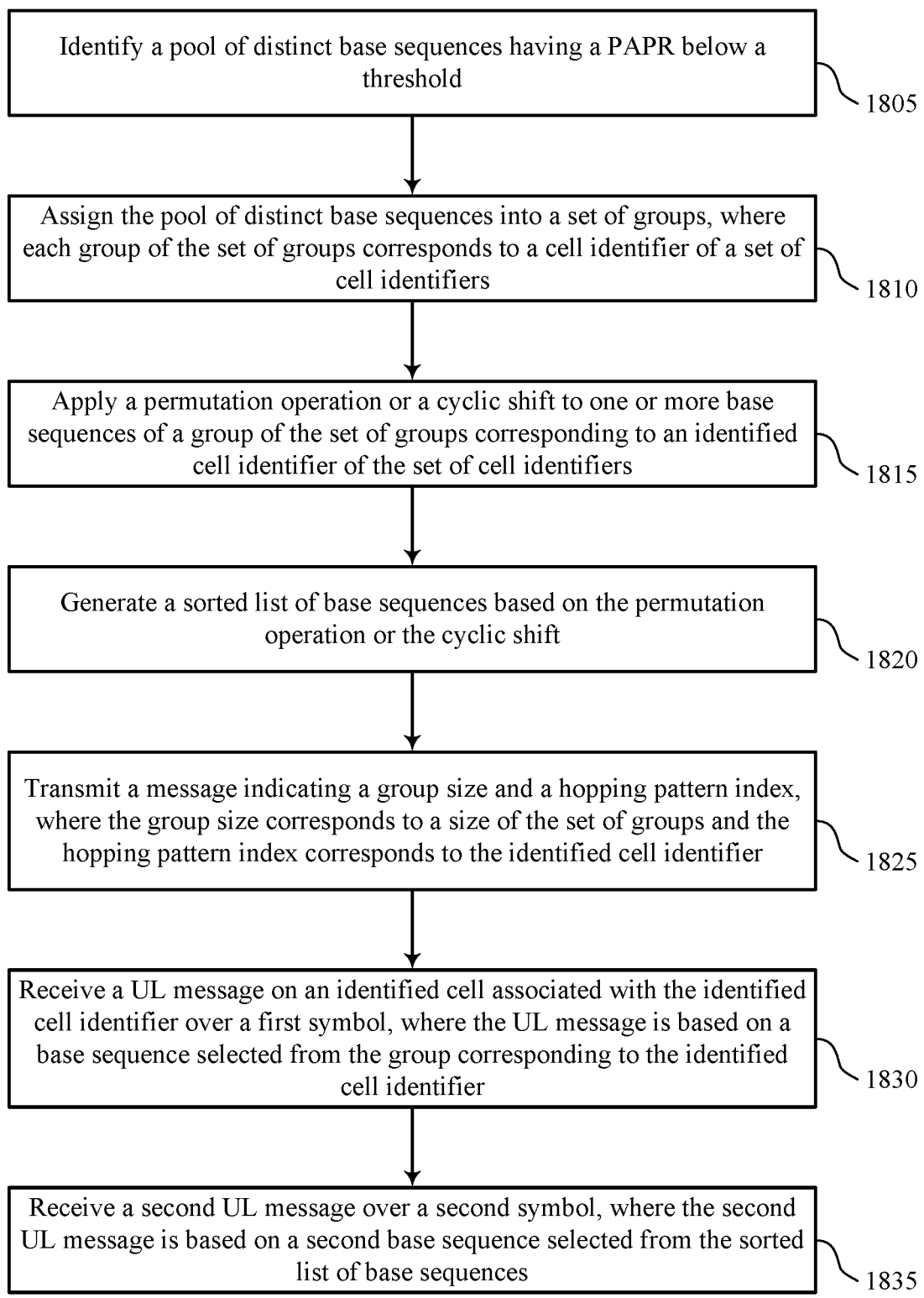

FIG. 18 shows a flowchart illustrating a method 1800 that supports group hopping enhancement for base sequences in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may identify a pool of distinct base sequences having a PAPR below a threshold. The operations of 1805 may be performed according to the methods described herein. In some examples, aspects of the operations of 1805 may be performed by a base sequence pool manager as described with reference to FIGS. 9 through 12.

At 1810, the base station may assign the pool of distinct base sequences into a set of groups, where each group of the set of groups corresponds to a cell identifier of a set of cell identifiers. The operations of 1810 may be performed according to the methods described herein. In some examples, aspects of the operations of 1810 may be performed by an assignment component as described with reference to FIGS. 9 through 12.

At 1815, the base station may apply a permutation operation or a cyclic shift to one or more base sequences of a group of the set of groups corresponding to an identified cell identifier of the set of cell identifiers. The operations of 1815 may be performed according to the methods described herein. In some examples, aspects of the operations of 1815 may be performed by a base sequence pool manager as described with reference to FIGS. 9 through 12.

At 1820, the base station may generate a sorted list of base sequences based on the permutation operation or the cyclic shift. The operations of 1820 may be performed according to the methods described herein. In some examples, aspects of the operations of 1820 may be performed by a base sequence pool manager as described with reference to FIGS. 9 through 12.

At 1825, the base station may transmit a message indicating a group size and a hopping pattern index, where the group size corresponds to a size of the set of groups and the hopping pattern index corresponds to the identified cell identifier. The operations of 1825 may be performed according to the methods described herein. In some examples, aspects of the operations of 1825 may be performed by a signaling manager as described with reference to FIGS. 9 through 12.

At 1830, the base station may receive a UL message on an identified cell associated with the identified cell identifier over a first symbol, where the UL message is based on a base sequence selected from the group corresponding to the identified cell identifier. The operations of 1830 may be performed according to the methods described herein. In some examples, aspects of the operations of 1830 may be performed by a UL message decoder as described with reference to FIGS. 9 through 12.

At 1835, the base station may receive a second UL message over a second symbol, where the second UL message is based on a second base sequence selected from the sorted list of base sequences. The operations of 1835 may be performed according to the methods described herein. In some examples, aspects of the operations of 1835 may be performed by a UL message decoder as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
receiving, from a base station, a message indicating a group size and a hopping pattern index, wherein the group size corresponds to a size of a plurality of groups of a pool of distinct base sequences having a peak to average power ratio below a threshold, and wherein the hopping pattern index corresponds to a cell identifier of a plurality of cell identifiers;
selecting a base sequence from a group of the plurality of groups indicated by the hopping pattern index, wherein the group corresponds to an identified cell identifier of the plurality of cell identifiers; and
transmitting an uplink message based at least in part on the selected base sequence on a cell corresponding to the identified cell identifier.

2. The method of claim 1, further comprising:
assigning the pool of distinct base sequences into the plurality of groups based at least in part on the group size, a hopping pattern reuse factor, and a size of the pool.

3. The method of claim 2, wherein assigning the pool of distinct base sequences further comprises:
constructing a table having a row length corresponding to the hopping pattern reuse factor and a column length corresponding to the group size, wherein each column of the table corresponds to a hopping pattern index of a plurality of hopping pattern indexes and a group of the plurality of groups.

4. The method of claim 3, wherein constructing the table further comprises:
filling columns of a first part of the table according to ascending index values of the pool of distinct base sequences; and
filling columns of a second part of the table according to a block interleaving pattern with respect to the first part of the table, wherein the block interleaving pattern comprises filling the columns of the second part of the table using index values from rows of the first part of the table.

5. The method of claim 1, further comprising:
applying a permutation operation or a cyclic shift to one or more base sequences of the group corresponding to the identified cell identifier; and
generating a sorted list of base sequences based at least in part on the permutation operation or the cyclic shift.

6. The method of claim 5, further comprising:
transmitting the uplink message using the selected base sequence over a first symbol;
selecting a second base sequence from the sorted list of base sequences; and
transmitting a second uplink message using the second base sequence over a second symbol.

7. The method of claim 1, wherein selecting the base sequence further comprises:
retrieving the base sequence from a look up table at the UE.

8. The method of claim 1, wherein the pool of distinct base sequences having the peak to average power ratio below the threshold comprises Zadoff-Chu sequences, computer generated search sequences, chirp sequences, Gold sequences, or a combination thereof.

9. The method of claim 1, wherein the uplink message comprises a grant-free message.

10. The method of claim 1, wherein the message indicating the group size and the hopping pattern index comprises a system information message.

11. A method for wireless communications at a base station, comprising:
identifying a pool of distinct base sequences having a peak to average power ratio below a threshold;
assigning the pool of distinct base sequences into a plurality of groups, wherein each group of the plurality of groups corresponds to a cell identifier of a plurality of cell identifiers; and
transmitting, to a user equipment (UE), a message indicating a group size and a hopping pattern index, wherein the group size corresponds to a size of the plurality of groups and the hopping pattern index corresponds to an identified cell identifier of the plurality of cell identifiers.

12. The method of claim 11, further comprising:
assigning the pool of distinct base sequences into the plurality of groups based at least in part on the group size, a hopping pattern reuse factor, and a size of the pool.

13. The method of claim 12, wherein assigning the pool of distinct base sequences further comprises:
constructing a table having a row length corresponding to the hopping pattern reuse factor and a column length corresponding to the group size, wherein each column of the table corresponds to a group of the plurality of groups.

14. The method of claim 13, wherein constructing the table further comprises:
filling columns of a first part of the table according to ascending index values of the pool of distinct base sequences; and
filling columns of a second part of the table according to a block interleaving pattern with respect to the first part of the table, wherein the block interleaving pattern comprises filling the columns of the second part of the table using index values from rows of the first part of the table.

15. The method of claim 11, further comprising:
applying a permutation operation or a cyclic shift to one or more base sequences of a group of the plurality of groups corresponding to the identified cell identifier; and
generating a sorted list of base sequences based at least in part on the permutation operation or the cyclic shift.

16. The method of claim 15, further comprising:
receiving an uplink message on an identified cell associated with the identified cell identifier over a first symbol, wherein the uplink message is based at least in part on a base sequence selected from the group corresponding to the identified cell identifier; and
receiving a second uplink message over a second symbol, wherein the second uplink message is based at least in part on a second base sequence selected from the sorted list of base sequences.

17. The method of claim 11, wherein the pool of distinct base sequences having the peak to average power ratio below the threshold comprises Zadoff-Chu sequences, computer generated search sequences, chirp sequences, Gold sequences, or a combination thereof.

18. The method of claim 11, wherein the message indicating the group size and the hopping pattern index comprises a system information message.

19. An apparatus for wireless communications at a user equipment (UE), comprising:
a processor,
memory coupled with the processor; and
instructions stored in the memory and executable by the processor to cause the apparatus to:
receive, from a base station, a message indicating a group size and a hopping pattern index, wherein the group size corresponds to a size of a plurality of groups of a pool of distinct base sequences having a peak to average power ratio below a threshold, and wherein the hopping pattern index corresponds to a cell identifier of a plurality of cell identifiers;
select a base sequence from a group of the plurality of groups indicated by the hopping pattern index, wherein the group corresponds to an identified cell identifier of the plurality of cell identifiers; and
transmit an uplink message based at least in part on the selected base sequence on a cell corresponding to the identified cell identifier.

20. The apparatus of claim 19, wherein the instructions are further executable by the processor to cause the apparatus to:
assign the pool of distinct base sequences into the plurality of groups based at least in part on the group size, a hopping pattern reuse factor, and a size of the pool.

21. The apparatus of claim 20, wherein the instructions are further executable by the processor to cause the apparatus to:
construct a table having a row length corresponding to the hopping pattern reuse factor and a column length corresponding to the group size, wherein each column of the table corresponds to a hopping pattern index of a plurality of hopping pattern indexes and a group of the plurality of groups.

22. The apparatus of claim 21, wherein the instructions are further executable by the processor to cause the apparatus to:
fill columns of a first part of the table according to ascending index values of the pool of distinct base sequences; and
fill columns of a second part of the table according to a block interleaving pattern with respect to the first part of the table, wherein the block interleaving pattern are executable by the processor to cause the apparatus to fill the columns of the second part of the table using index values from rows of the first part of the table.

23. The apparatus of claim 19, wherein the instructions are further executable by the processor to cause the apparatus to:
apply a permutation operation or a cyclic shift to one or more base sequences of the group corresponding to the identified cell identifier; and
generate a sorted list of base sequences based at least in part on the permutation operation or the cyclic shift.

24. The apparatus of claim 23, wherein the instructions are further executable by the processor to cause the apparatus to:
transmit the uplink message using the selected base sequence over a first symbol;
select a second base sequence from the sorted list of base sequences; and
transmit a second uplink message using the second base sequence over a second symbol.

25. The apparatus of claim 19, wherein the instructions are further executable by the processor to cause the apparatus to:
retrieve the base sequence from a look up table at the UE.

26. The apparatus of claim 19, wherein the uplink message comprises a grant-free message.

27. An apparatus for wireless communications at a base station, comprising:
a processor,
memory coupled with the processor; and
instructions stored in the memory and executable by the processor to cause the apparatus to:
identify a pool of distinct base sequences having a peak to average power ratio below a threshold;
assign the pool of distinct base sequences into a plurality of groups, wherein each group of the plurality of groups corresponds to a cell identifier of a plurality of cell identifiers; and
transmit, to a user equipment (UE), a message indicating a group size and a hopping pattern index, wherein the group size corresponds to a size of the plurality of groups and the hopping pattern index corresponds to an identified cell identifier of the plurality of cell identifiers.

28. The apparatus of claim 27, wherein the instructions are further executable by the processor to cause the apparatus to:
assign the pool of distinct base sequences into the plurality of groups based at least in part on the group size, a hopping pattern reuse factor, and a size of the pool.

29. The apparatus of claim 28, wherein the instructions are further executable by the processor to cause the apparatus to:
construct a table having a row length corresponding to the hopping pattern reuse factor and a column length corresponding to the group size, wherein each column of the table corresponds to a group of the plurality of groups.

30. The apparatus of claim 27, wherein the instructions are further executable by the processor to cause the apparatus to:
apply a permutation operation or a cyclic shift to one or more base sequences of a group of the plurality of groups corresponding to the identified cell identifier; and
generate a sorted list of base sequences based at least in part on the permutation operation or the cyclic shift.

* * * * *